(12) United States Patent
Watanabe et al.

(10) Patent No.: US 8,593,530 B2
(45) Date of Patent: Nov. 26, 2013

(54) IMAGE STABILIZATION DEVICE, IMAGE STABILIZATION METHOD, AND PROGRAM

(75) Inventors: Shinji Watanabe, Tokyo (JP); Nobuhiro Ogawa, Tokyo (JP); Tatsumi Sakaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 274 days.

(21) Appl. No.: 13/111,326

(22) Filed: May 19, 2011

(65) Prior Publication Data

US 2011/0298936 A1      Dec. 8, 2011

(30) Foreign Application Priority Data

Jun. 7, 2010  (JP) .................................. 2010-130436

(51) Int. Cl.
*H04N 5/228* (2006.01)

(52) U.S. Cl.
USPC .................................. 348/208.4; 348/208.99

(58) Field of Classification Search
USPC .................. 348/208.99, 208.1–208.6, 208.14
See application file for complete search history.

(56) References Cited

U.S. PATENT DOCUMENTS

| | | | |
|---|---|---|---|
| 2008/0186386 A1* | 8/2008 | Okada et al. | 348/208.4 |
| 2009/0046160 A1* | 2/2009 | Hayashi | 348/208.6 |
| 2009/0059017 A1* | 3/2009 | Kurokawa | 348/208.1 |
| 2009/0278945 A1* | 11/2009 | Lin | 348/208.1 |
| 2010/0157073 A1* | 6/2010 | Kondo et al. | 348/208.4 |
| 2010/0214423 A1* | 8/2010 | Ogawa | 348/208.4 |
| 2011/0157379 A1* | 6/2011 | Kimura | 348/208.2 |

FOREIGN PATENT DOCUMENTS

JP      2000-221954      8/2000

OTHER PUBLICATIONS

U.S. Appl. No. 13/114,576, filed May 24, 2011, Ogawa, et al.

* cited by examiner

*Primary Examiner* — Kelly L Jerabek
(74) *Attorney, Agent, or Firm* — Oblon, Spivak, McClelland, Maier & Neustadt, L.L.P.

(57) ABSTRACT

Provided is an image stabilization device including an image capturing unit for capturing an image of a face of a user, a motion detection unit for detecting motion of the face whose image has been captured by the image capturing unit, a motion prediction unit for predicting motion of the face to be detected at a next time point, based on the motion of the face detected in time-series by the motion detection unit, an image data display unit for displaying image data, and a motion correction unit for performing control on the image data display unit to move the image data in a direction of cancelling the motion of the face predicted by the motion prediction unit.

4 Claims, 22 Drawing Sheets

CASE WHERE THERE IS NO CORRELATION BETWEEN
SHAKING OF USER AND SHAKING OF APPLIANCE

10: PORTABLE APPLIANCE                    20: USER

14: DISPLAYED OBJECT (SHAKE CANCELLING APPLIED)

CASE WHERE THERE IS NO CORRELATION BETWEEN SHAKING OF USER AND SHAKING OF APPLIANCE

10: PORTABLE APPLIANCE
20: USER
14: DISPLAYED OBJECT (SHAKE CANCELLING APPLIED)

EXAMPLE OF FIR FILTER HAVING LOW-PASS CHARACTERISTIC

FIG.19
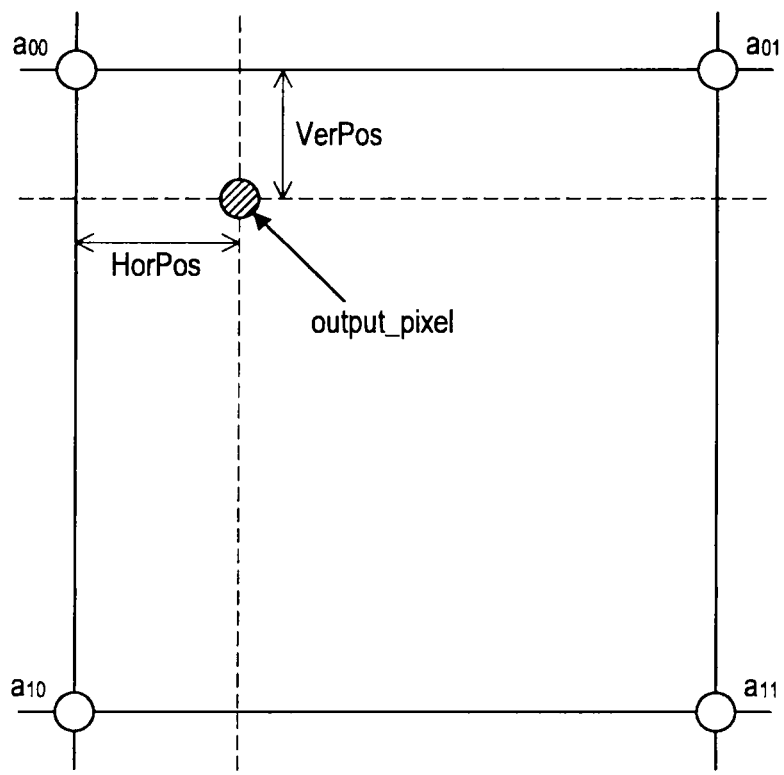
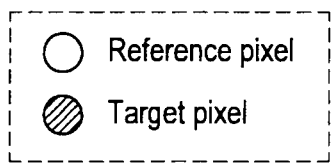
output_pixel=(a$_{00}$ (1-HorPos)+a$_{01}$ HorPos) (1-VerPos)
+(a$_{10}$ (1-VerPos)+a$_{11}$ HorPos) VerPos

FIG.21

| USE INFORMATION | FILTER STRENGTH WEIGHTING COEFFICIENT |
|---|---|
| USE 1 (FOR VIDEO) | 1 |
| USE 2 (FOR TEXTS) | 3 |
| ⋮ | ⋮ |
| USE N (FOR ATTRIBUTE INFORMATION DISPLAY) | 0 |

IMAGE STABILIZATION DEVICE, IMAGE STABILIZATION METHOD, AND PROGRAM

BACKGROUND OF THE INVENTION

1. Field of the Invention

The present invention relates to an image stabilization device, an image stabilization method, and a program.

2. Description of the Related Art

In recent years, small electronic appliances (hereinafter, portable appliances) such as mobile phones, portable game machines, portable information terminals, notebook computers (hereinafter, notebook PCs), portable music players, digital video cameras and digital still cameras (hereinafter, image capturing devices), and the like have come to be widely used. These portable appliances are used in various places. For example, users are seen to be using the portable appliances on a vehicle while moving, on a street corner, in a waiting room in an office building, in the living room at home, and the like.

As such, use scenes are becoming more various as the portable appliances are made smaller and their portability is increased. However, although the effect of increase in the portability increases the convenience of carrying, it does not increase the applicability to various use scenes. For example, although a portable appliance is small and thus is easy to carry onto a vehicle, a quick and accurate operation thereof is difficult on a bouncing vehicle. Accordingly, companies manufacturing portable appliances are refining structures of holding portions of portable appliances or the forms of operation means, for example.

Furthermore, there is also an issue that it is difficult to correctly perceive images, texts, or the like displayed on display means of a portable appliance while on a bouncing vehicle or while walking. That is, images, texts, or the like displayed on the display means are blurred due to the shaking of the portable appliance, thus making it difficult to see the displayed contents. Such blurring of images, texts, or the like is very tiring to the optic nerve of a user. Thus, a technology has been developed that moves images, texts, or the like in a direction that cancels the shaking of a portable appliance, thereby reducing the blurring of the images, texts, or the like.

With respect to the technology above, JP 2000-221954A discloses a technology for detecting shaking of a portable appliance and moving a display image in a direction that cancels the shaking. The patent document also discloses a technology for truncating a region not displayed on the screen when the display image is moved. Furthermore, the patent document discloses a technology for detecting shaking of the portable appliance by using an accelerometer. The technology disclosed in the patent document here is for calculating shaking of a phase opposite to the phase of the shaking of a portable appliance and adding this shaking to the display image to cancel the shaking of the portable appliance.

SUMMARY OF THE INVENTION

However, a delay occurs between the timing of occurrence of shaking of a portable appliance and the timing of motion compensation of a display image due to computational processing or the like. Thus, in the case the shaking of the portable appliance is weak, the phase of the shaking of the portable appliance and the phase of shaking given to the display image will be approximately opposite, but in the case the shaking of the portable appliance is intense, the phases of the shaking will not be opposite. In some cases, the phases of the shaking are intensified by each other. As a result, shaking of the display image relative to the user's gaze point is increased and will be even more tiring to the optic nerve of the user.

For example, when using the portable appliance on a bouncing vehicle, a fine shaking is likely to occur on the portable appliance. Accordingly, if the technology of the patent document described above is applied, discrepancy between phases will occur frequently between the shaking of the portable appliance and the shaking given to the display image to cancel the above-mentioned shaking, and thus the shaking of the display image relative to the user's gaze point will be even more increased. Furthermore, eyes of a human have a function of following the motion of a viewing target. Thus, even if the display image is not completely still relative to the user's gaze point, the display image can be correctly viewed.

In light of the foregoing, it is desirable to provide an image stabilization device, an image stabilization method, and a program which are novel and improved, and which are capable of reducing shaking of a display image relative to a user's gaze point in the case shaking of a portable appliance occurs, thereby reducing the fatigue of the user.

According to an embodiment of the present invention, there is provided an image stabilization device which includes an image capturing unit for capturing an image of a face of a user, a motion detection unit for detecting motion of the face whose image has been captured by the image capturing unit, a motion prediction unit for predicting motion of the face to be detected at a next time point, based on the motion of the face detected in time-series by the motion detection unit, an image data display unit for displaying image data, and a motion correction unit for performing control on the image data display unit to move the image data in a direction of cancelling the motion of the face predicted by the motion prediction unit.

The image stabilization device may further include a gaze point detection unit for detecting a position of a gaze point from the image of the face captured by the image capturing unit, and a protected area setting unit for setting, in the image data, an image area of a predetermined range centred on the position of the gaze point, which has been detected by the gaze point detection unit, as a protected area. In this case, the motion correction unit performs control on the image data display unit to move, within a range that allows display of all of the protected area set by the protected area setting unit, the image data in the direction of cancelling the motion of the face predicted by the motion prediction unit.

The image stabilization device may further include a gaze point detection unit for detecting a position of a gaze point from the image of the face captured by the image capturing unit, and a gaze area determination unit for determining, in the image data, a gaze area of a predetermined size including a displayed object existing at the position of the gaze point detected by the gaze point detection unit. In this case, the motion correction unit performs control on the image data display unit to move, within a range that allows display of the gaze area determined by the gaze area determination unit, the image data in the direction of cancelling the motion of the face predicted by the motion prediction unit.

The motion correction unit may perform control on the image data display unit to move the image data in the direction of cancelling the motion of the face predicted by the motion prediction unit in such a way that a degree of cancellation of the motion of the face gradually becomes smaller as a distance between a frame of a display screen displaying the image data and the gaze area becomes shorter.

According to another embodiment of the present invention, there is provided an image stabilization method which includes the steps of capturing an image of a face of a user, detecting motion of the face whose image has been captured in the step of capturing, predicting motion of the face to be detected at a next time point, based on the motion of the face detected in time-series in the step of detecting, displaying image data, and performing control, in the step of displaying, to move the image data in a direction of cancelling the motion of the face predicted in the step of predicting.

According to another embodiment of the present invention, there is provided a program for causing a computer to realize an image capturing function of capturing an image of a face of a user, a motion detection function of detecting motion of the face whose image has been captured by the image capturing function, a motion prediction function of predicting motion of the face to be detected at a next time point, based on the motion of the face detected in time-series by the motion detection function, an image data display function of displaying image data, and a motion correction function of performing control, in relation to the image data display function, to move the image data in a direction of cancelling the motion of the face predicted by the motion prediction function.

According to another embodiment of the present invention, there is provided a computer-readable recording medium in which the program is recorded.

According to the embodiments of the present invention described above, it is possible to reduce shaking of a display image relative to a user's gaze point in the case shaking of a portable appliance occurs, thereby reducing the fatigue of the user.

BRIEF DESCRIPTION OF THE DRAWINGS

FIG. 19 is an explanatory diagram for describing a shake cancelling method according to the embodiment;

FIG. 21 is an explanatory diagram for describing a determination method of filter strength according to the embodiment.

DETAILED DESCRIPTION OF THE EMBODIMENT(S)

Figure 1:
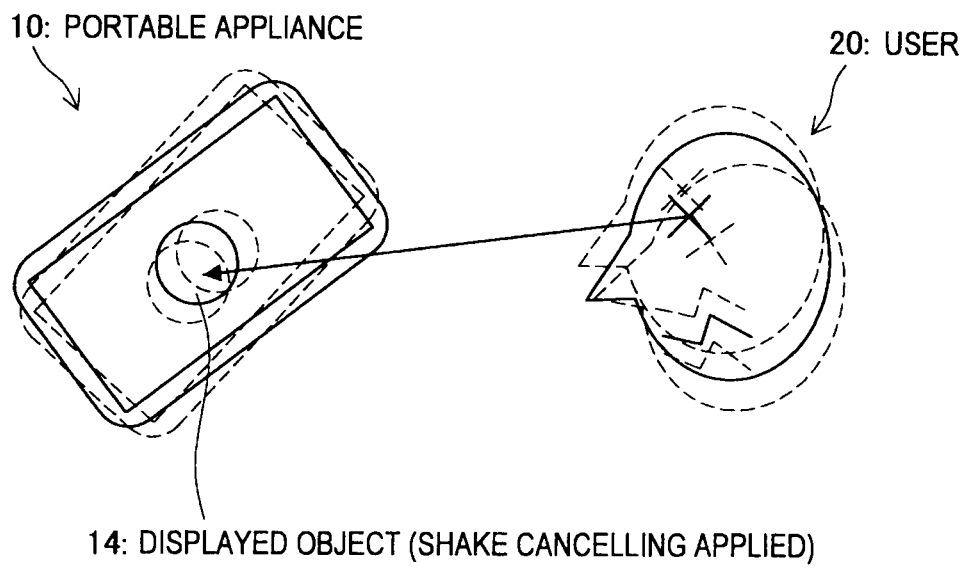
FIG. 1 is an explanatory diagram for describing an issue arising at the time of applying shake cancelling.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of description of an embodiment of the present invention described below will be briefly mentioned here.

Figure 2:
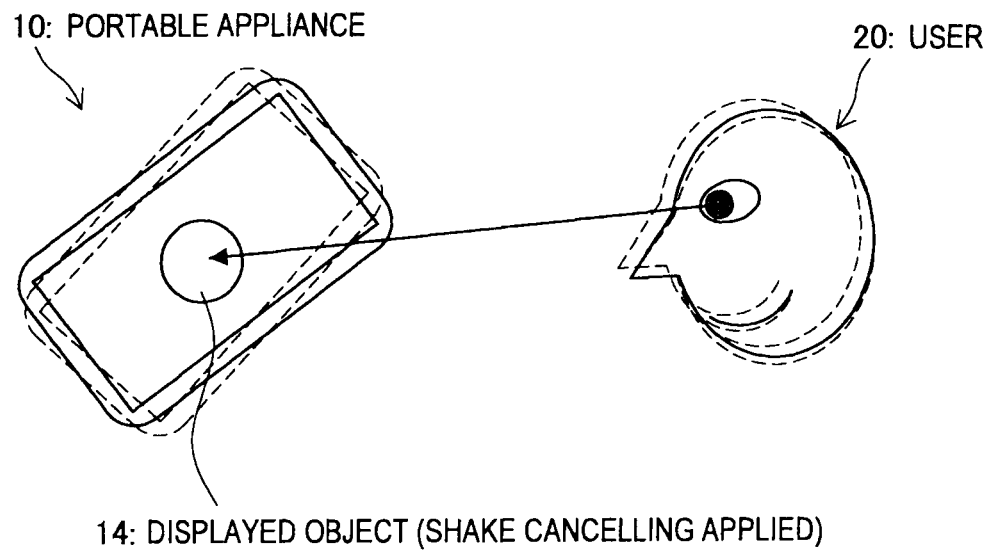
FIG. 2 is an explanatory diagram for describing an issue arising at the time of applying shake cancelling.

First, an impact of shaking of a user and an appliance on the visibility of image data will be considered with reference to FIGS. 1 and 2. Next, a functional configuration of a portable appliance 10 according to an embodiment of the present invention will be described with reference to FIG. 3. Then, an operation of a user state detection unit 115 according to the embodiment will be described with reference to FIG. 4. Then, a calculation method of applied cancellation strength according to the embodiment will be described with reference to FIGS. 5 and 6.

Next, an operation of a filter unit 116 according to the embodiment will be described with reference to FIG. 7. Then, a calculation method of a correction amount used at the time of application of shake cancelling according to the embodiment will be described with reference to FIGS. 8 and 9. At this time, an example of a filter used at the time of application of shake cancelling according to the embodiment will be described with reference to FIG. 10.

Next, a method of setting a protected area and a maximum screen movement amount that are taken into account at the time of application of shake cancelling according to embodiment will be described with reference to FIGS. 11 and 12. Then, a method of setting a gaze area, a protected area, and a maximum screen movement amount that are taken into account at the time of application of shake cancelling according to embodiment will be described with reference to FIGS. 13 to 18. Then, a motion compensation method according to the embodiment will be described with reference to FIG. 19. Furthermore, a layer multiplexing method according to the embodiment will be described with reference to FIG. 20.

Furthermore, a control method of applied cancellation strength according to the use of a layer according to a modification of the embodiment will be described with reference to FIG. 21. Next, a configuration of hardware capable of realizing the functions of the portable appliances 10 according to the embodiment will be described with reference to FIG. 22. Lastly, the technical idea of the embodiment will be summarized and operational effects obtained by the technical idea will be briefly described.

(Description Items)
1: Introduction
2: Embodiment
   2-1: Functional Configuration of Portable Appliance 10
   2-2: Operation of User State Detection Unit 115
   2-2-1: Flow of Processes
   2-2-2: Calculation Method of Shake Coefficient
   2-2-3: Calculation Method of Applied Cancellation Strength
   2-3: Operation of Filter Unit 116
   2-3-1: Flow of Processes
   2-3-2: Calculation of Predicted Position
   2-3-3: Calculation of Correction Amount
   2-3-4: Determination Method of Maximum Screen Movement Amount Taking Protected Area and the Like into Account
   2-3-5: Determination Method of Maximum Screen Movement Amount Taking Gaze Area into Account
   2-4: Modification (Control Method of Applied Cancellation Strength According to Layer Use)
3: Hardware Configuration
4: Summary

1: Introduction

First, an impact that is imposed on the visibility of image data (a displayed object 14) when a portable appliance 10 and a user 20 are both shaking will be considered with reference to FIGS. 1 and 2. As described above, the portable appliance 10 such as a mobile phone, a portable game machine, or the like may be used on a bouncing vehicle or while walking. In such a case, the portable appliance 10 is shaking relative to the user 20's gaze point, and the visibility of the displayed object 14 displayed on the screen is reduced.

Accordingly, to prevent such deterioration in the visibility, a technology for detecting shaking of the portable appliance 10 and moving the displayed object 14 so as to cancel such shaking is devised. However, as shown in FIG. 1, if there is no correlation between the shaking of the portable appliance 10 and the shaking of the user 20, the shaking of the displayed object 14 relative to the user 20's gaze point is not cancelled even if the displayed object 14 is moved in such a way as to cancel the shaking of the portable appliance 10.

On the other hand, as shown in FIG. 2, if there is a correlation between the shaking of the portable appliance 10 and the shaking of the user 20, the shaking of the displayed object 14 relative to the user 20's gaze point is cancelled if the displayed object 14 is moved in such a way as to cancel the shaking of the portable appliance 10. That is, the relative positional relationship between the portable appliance 10 and the user 20 is changed due to the shaking of both the portable appliance 10 and the user 20, and if the displayed object 14 is not moved in such a way as to cancel this change, the shaking of the displayed object 14 relative to the user 20's gaze point will not be cancelled.

Accordingly, the inventors of the present application have devised a method of moving the displayed object 14 in a direction of cancelling the motion of the user 20 seen from the portable appliance 10 (relative motion). This method will be described below in detail.

2: Embodiment

An embodiment of the present invention will be described. The present embodiment relates to a method of reducing shaking of the displayed object 14 occurring relative to the user 20's gaze point in a situation where shaking is caused on the portable appliance 10. Particularly, the present embodiment relates to a method of reducing the shaking of the displayed object 14 relative to the user 20's gaze point even in the case where the portable appliance 10 and the user 20 are shaking in an uncorrelated manner. Note that this method is not for "stilling" the displayed object 14 relative to the user 20's gaze point, but for "reducing" the shaking of the displayed object 14 so as to reduce the fatigue of the user.

[2-1: Functional Configuration of Portable Appliance 10]

Figure 3:
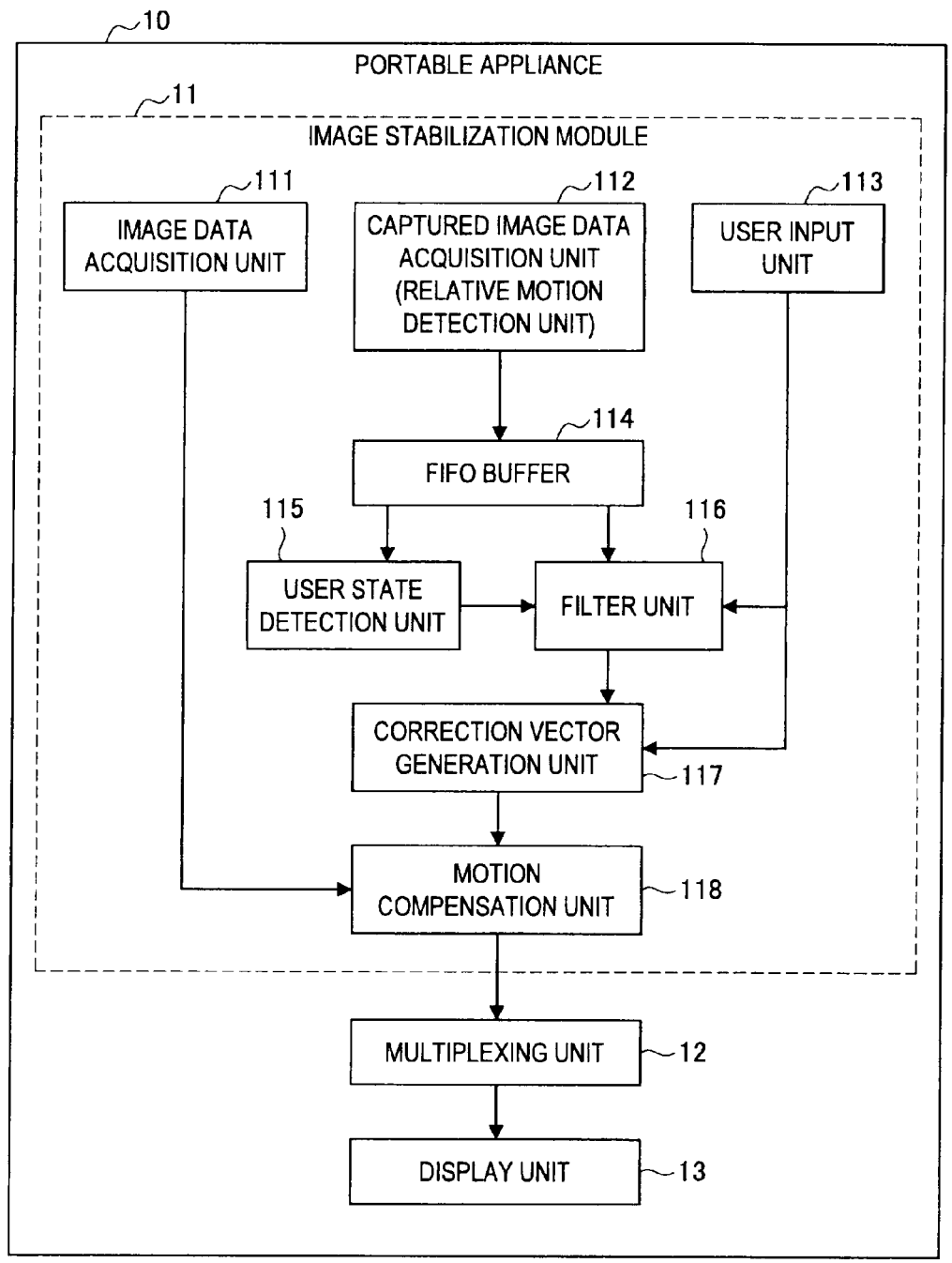
FIG. 3 is an explanatory diagram for describing a functional configuration of a portable appliance according to an embodiment of the present invention.

First, a functional configuration of the portable appliance 10 according to the present embodiment will be described with reference to FIG. 3. FIG. 3 is an explanatory diagram for describing a functional configuration of the portable appliance 10 according to the present embodiment.

As shown in FIG. 3, the portable appliance 10 mainly includes an image stabilization module 11, a multiplexing unit 12, and a display unit 13. The image stabilization module 11 is means for reducing shaking of the displayed object 14 relative to the user 20's gaze point. The multiplexing unit 12 is means for multiplexing a plurality of layers and creating the displayed object 14. The display unit 13 is means for displaying the displayed object 14 created by the multiplexing unit 12. The feature of the portable appliance 10 according to the present embodiment lies mainly in the configuration of the image stabilization module 11. Thus, in the following, the configuration of the image stabilization module 11 will be described in greater detail.

As shown in FIG. 3, the image stabilization module 11 mainly includes an image data acquisition unit 111, a captured image data acquisition unit 112, a user input unit 113, a FIFO buffer 114, and a user state detection unit 115. Furthermore, the image stabilization module 11 includes a filter unit 116, a correction vector generation unit 117, and a motion compensation unit 118.

(Image Data Acquisition Unit 111)

The image data acquisition unit 111 is means for acquiring image data. For example, the image data acquisition unit 111 acquires a time-series frame group. Incidentally, frames forming this frame group may be placed at constant time intervals (fixed frame intervals) or may be placed at arbitrary time intervals (variable frame intervals). Also, each frame is configured from a plurality of layers.

Additionally, a number indicating the position in an overlaying order and use information are associated with each layer. For example, a number 0 is associated with the top layer, and a number 1 is associated with the next layer. Also, the use information is for specifying the use of an image displayed on a layer, such as a menu screen, a video screen, an operation object, or the like. Image data acquired by the image data acquisition unit 111 is input to the motion compensation unit 118. In the following explanation, each frame or each layer may be sometimes called image data.

(Captured Image Data Acquisition Unit 112)

The captured image data acquisition unit 112 is means for acquiring captured image data obtained by shooting an image of the user 20. For example, the captured image data acquisition unit 112 acquires motion data indicating the motion of the face of the user 20. Also, the captured image data acquisition unit 112 acquires motion data indicating the motion of the eyes of the user 20. The motion of the face and the position of the gaze point can be detected from these pieces of motion data. The gaze point of the user 20 can be detected. Additionally, the captured image data acquisition unit 112 may also include image capturing means for capturing an image of the user 20 and image processing means for detecting motion data of the user 20 from the captured image data. Furthermore, the motion data of the user 20 acquired by the captured image data acquisition unit 112 is input to the FIFO buffer 114.

(User Input Unit 113)

The user input unit 113 is means for the user 20 to input various types of data.

(FIFO Buffer 114)

The FIFO buffer 114 is means for accumulating the motion data input by the captured image data acquisition unit 112. Additionally, when the next motion data is input in a state where a predetermined accumulation amount is full, the FIFO buffer 114 discards the oldest motion data. This accumulation amount is set to a data amount for one second (for example, thirty frames in the case the frame rate is 30 fps), for example. The motion data accumulated in the FIFO buffer 114 is read by the user state detection unit 115 and the filter unit 116.

(User State Detection Unit 115)

The user state detection unit 115 is means for calculating applied cancellation strength. Additionally, the applied cancellation strength here is a value indicating the strength of cancellation of the shaking of image data relative to the user 20's gaze point. First, the user state detection unit 115 acquires motion data $(D_t, \ldots, D_{t+n})$ from the FIFO buffer 114. Additionally, $D_t$ is motion data detected at time t. The user state detection unit 115 which has acquired the motion data $(D_t, \ldots, D_{t+n})$ inputs the motion data $(D_t, \ldots, D_{t+n})$ to a predetermined function f and calculates a shake coefficient s, as shown in formula (1) below.

[Equation 1]

$$s = f(D_t, \Lambda, D_{t+n}) \quad (1)$$

This function f is a transformation formula for quantifying the intensity of the motion expressed by the motion data $(D_t, \ldots, D_{t+n})$. Also, the shake coefficient s is a numerical value expressing the intensity of the motion expressed by the motion data $(D_t, \ldots, D_{t+n})$. For example, the above-described function f is a transformation formula for orthogonally transforming the motion data $(D_t, \ldots, D_{t+n})$ and outputting a maximum amplitude value in a predetermined frequency domain. Additionally, as an example of the orthogonal transformation, Fourier transform or the like may be taken.

Figure 5:
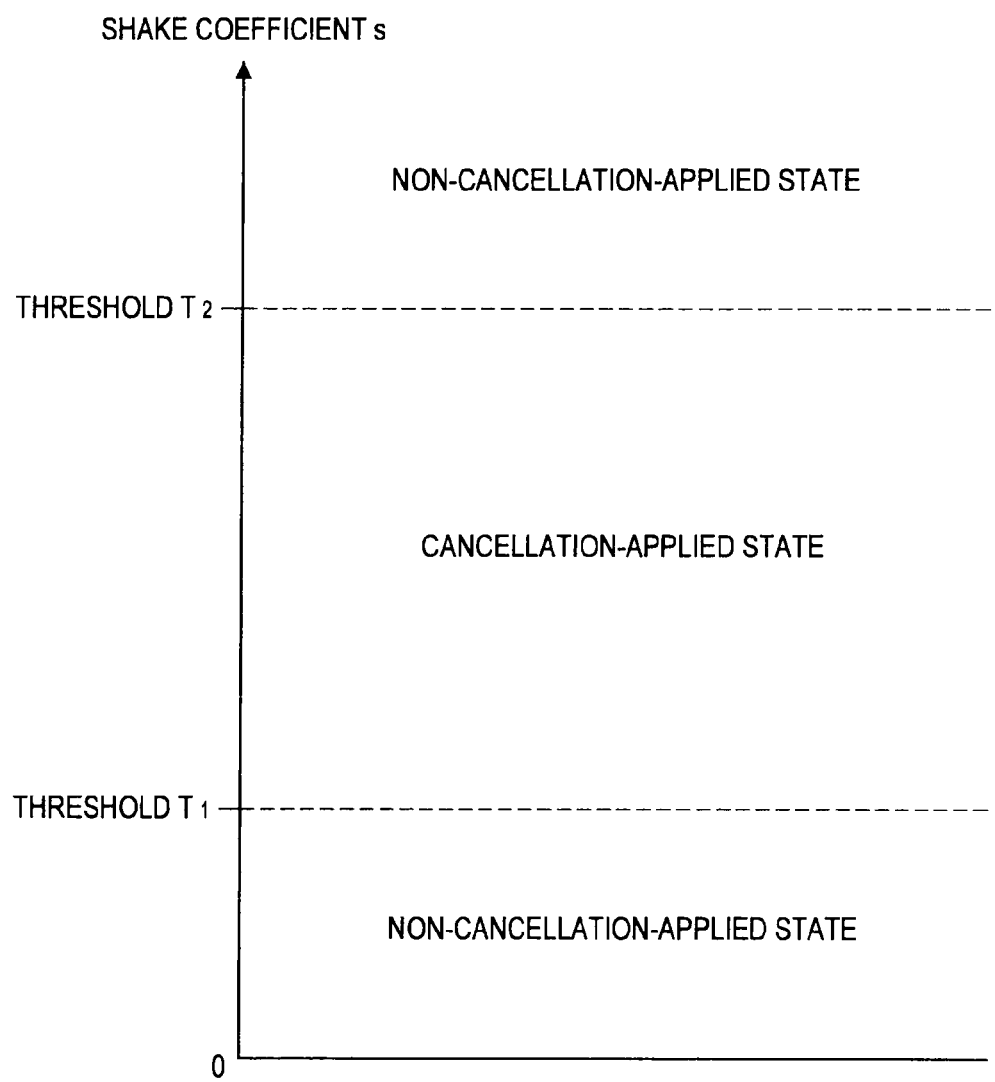
FIG. 5 is an explanatory diagram for describing a control method of shake cancelling application according to the embodiment.

The user state detection unit 115 which has calculated the shake coefficient s in the above manner calculates applied cancellation strength based on the shake coefficient s. For example, in the case only two states, namely a case where cancellation is to be applied and a case where cancellation is not to be applied, are to be taken into account, the user state detection unit 115 calculates the applied cancellation strength based on comparison results between the shake coefficient s and two thresholds $T_1$ and $T_2$, as shown in FIG. 5. Additionally, the applied cancellation strength is 1.0 in the case of a cancellation-applied state. On the other hand, the applied cancellation strength is 0.0 in the case of a non-cancellation-applied state.

As described above, a case where the shake coefficient s is large is a state where the shaking of the portable appliance 10 is intense. In the case the shaking of the portable appliance 10 is intense, if image data is moved in a direction of cancelling the shaking, the shaking of the image data relative to the user 20's gaze point is not reduced, but on the contrary, the shaking of the image data relative to the user 20's gaze point is possibly increased. Furthermore, if the image data is greatly moved, much of the image area will move out of the screen and a non-displayed area of the image data will be too large. Thus, it is assumed preferable that cancellation of shaking is not applied in the case the shaking of the portable appliance 10 is intense.

On the other hand, a case where the shake coefficient s is small is a state where the shaking of the portable appliance 10 is slow. In the case the shaking of the portable appliance 10 is slow, the user 20 can follow the motion of the image data without becoming tired. Thus, no cancellation is necessary in the case the shake coefficient s is small.

For the above reason, thresholds $T_1$ and $T_2$ are preferably determined as follows. For example, threshold $T_1$ is preferably determined such that the range of the shaking indicated by the shake coefficient s will be about 1% of the screen size. That is, threshold $T_1$ is preferably determined such that the shaking of the image data relative to the user 20's gaze point will be a negligible value. On the other hand, with respect to threshold $T_2$, the range of the shaking indicated by the shake coefficient s is preferably about 10% of the screen size. That is, it is preferably determined to be a value according to which, in the case cancellation has been applied, the effect of cancellation is obtained and the non-displayed area is not too large.

Additionally, the numerical values of thresholds $T_1$ and $T_2$ are not limited to the examples described above. Also, thresholds $T_1$ and $T_2$ may be fixed values, or they may be variable.

The determination method of the applied cancellation strength described above takes into account only two states, namely a state where cancellation is to be applied and a state where cancellation is not to be applied. In contrast, a method of successively determining the applied cancellation strengths according to the shake coefficients s is also conceivable.

Figure 6:
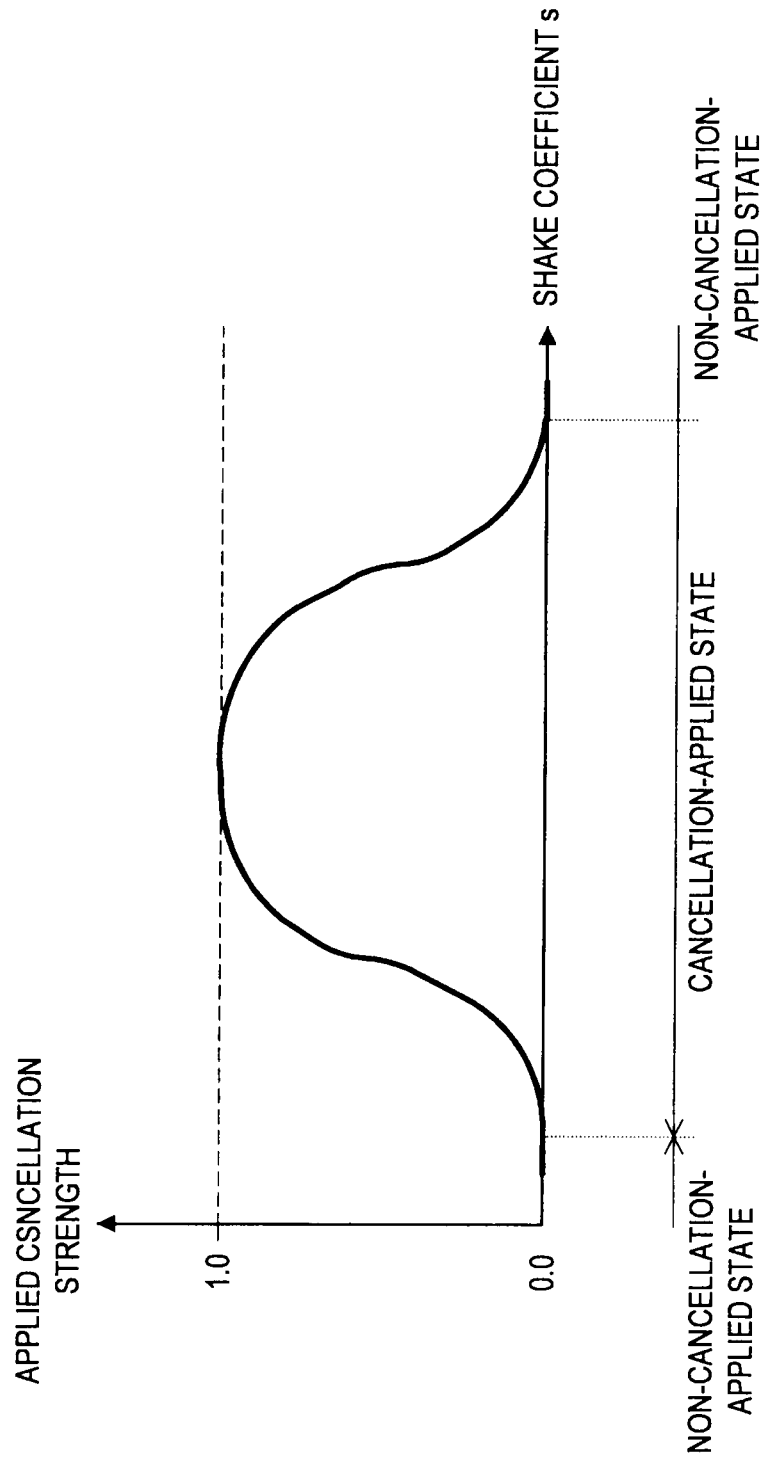
FIG. 6 is an explanatory diagram for describing a control method of shake cancelling application according to the embodiment.

For example, the applied cancellation strength can be defined by a real number between 0.0 and 1.0, as shown in FIG. 6. In this case, the non-cancellation-applied state is defined to be a state where the applied cancellation strength is 0.0. Furthermore, the characteristic of the applied cancellation strength is expressed by a curved line as shown in FIG. 6 or other curved lines or linear lines. Of course, the form of the characteristic curve determining the applied cancellation strength according to the shake coefficient s is not limited to the example in FIG. 6. Additionally, in the following, an explanation will be given assuming a case where applied cancellation strength defined by successive values is used.

As described above, the user state detection unit 115 calculates the shake coefficient s by using the motion data $(D_t, \ldots, D_{t+n})$ read from the FIFO buffer 114, and calculates the applied cancellation strength based on the shake coefficient s. The applied cancellation strength calculated by the user state detection unit 115 in this manner is input to the filter unit 116.

Furthermore, the user state detection unit 115 detects the gaze point of the user 20 based on the motion data of the eyes of the user 20 read from the FIFO buffer 114. For example, the user state detection unit 115 detects the gaze point of the user 20 from the motion data indicating the motion of the eyes by using the technology of the line-of-sight detection system described in JP H10-91325A. Gaze point data indicating the gaze point of the user 20 (where on the screen the user 20 is looking at) detected by the user state detection unit 115 in this manner is input to the filter unit 116.

(Filter Unit 116)

The filter unit 116 is means for calculating the amount by which image data is to be moved to cancel the shaking of the image data relative to the user 20's gaze point (hereinafter, correction amount). First, the filter unit 116 reads the motion data of a face ($D_t, \ldots, D_{t-n}$) from the FIFO buffer 114, and calculates motion data of the face $D_{t+n+1}$ at a display time point t+n+1 of a next frame. Additionally, the motion data of the face ($D_t, \ldots, D_{t+n}$) indicates the relative position (coordinate value) of the face of the user 20 seen from the portable appliance 10 at each time point.

Figure 8:
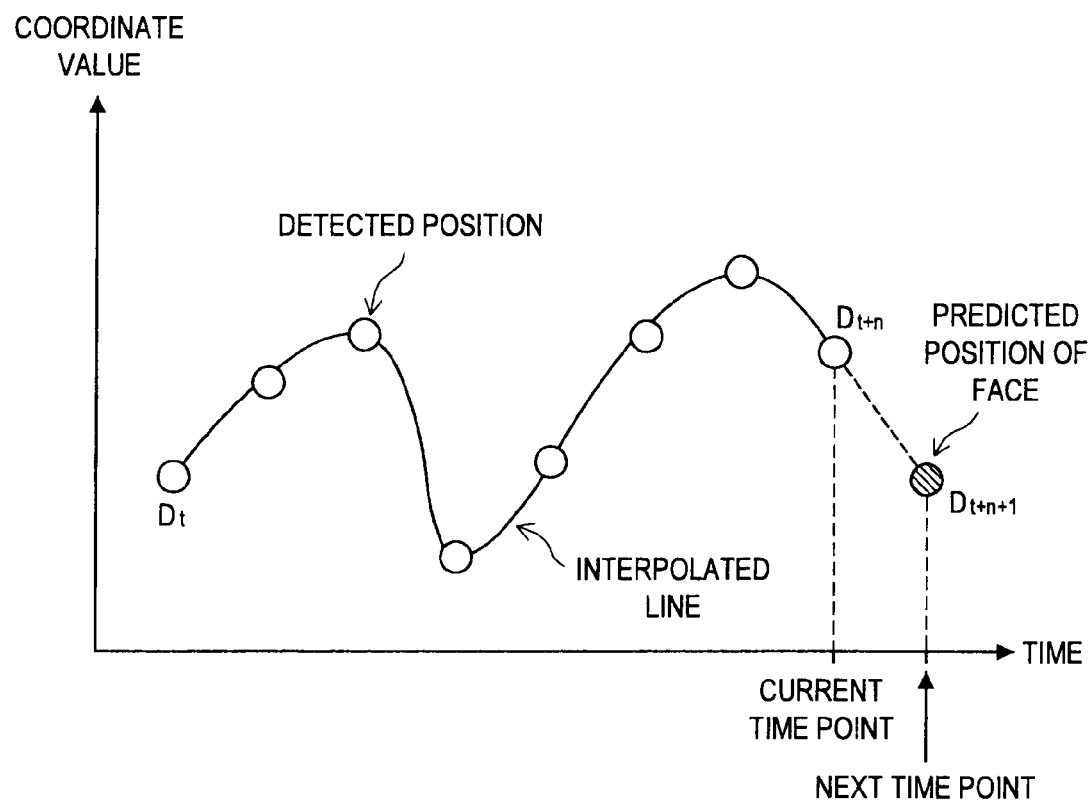
FIG. 8 is an explanatory diagram for describing a calculation method of a correction amount used for shake cancelling according to the embodiment.

Furthermore, the motion data of the face $D_{t+n+1}$ indicates a predicted position of the face predicted from the motion data of the face acquired by the captured image data acquisition unit 112. Additionally, the calculation method of the motion data $D_{t+n+1}$ may be a linear prediction method using two adjacent samples ($D_{t+n+1}, D_{t+n}$) as shown in FIG. 8 or a prediction method using a spline curve of the motion data ($D_t, \ldots, D_{t+n}$), for example.

Then, the filter unit 116 applies motion data ($D_t, \ldots, D_{t+n}$, $D_{t+n+1}$) including the predicted position to a predetermined filter. As this filter, a filter having a low-pass characteristic or a band-pass characteristic, such as an averaging filter, a bilateral filter or the like, can be used. For example, a FIR filter shown in FIG. 10 can be used. Additionally, the filter unit 116 changes the tap length of the filter according to the applied cancellation strength input by the user state detection unit 115 or according to filter strength input by the user 20 via the user input unit 113.

For example, in the case the applied cancellation strength is strong, the filter unit 116 increases the tap length of the filter. On the other hand, in the case the applied cancellation strength is weak, the filter unit 116 reduces the tap length of the filter. Also, in the case the filter strength input by the user 20 is strong, the filter unit 116 increases the tap length of the filter. On the other hand, in the case the filter strength input by the user 20 is weak, the filter unit 116 reduces the tap length of the filter. For example, the filter unit 116 decides a standard tap length to be thirty samples or the like, and increases or reduces, according to the applied cancellation strength, the tap length in relation to the standard tap length.

Figure 9:
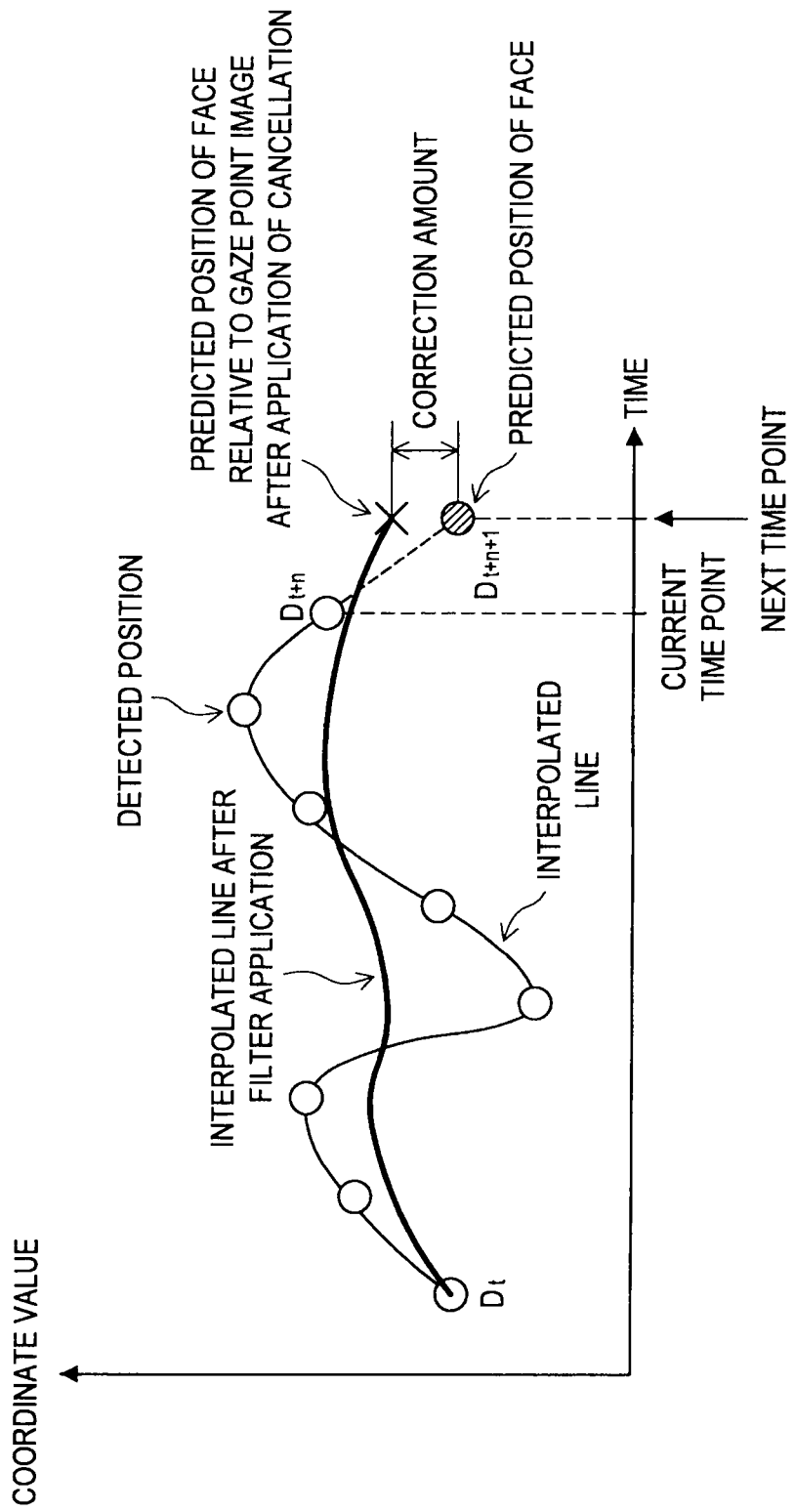
FIG. 9 is an explanatory diagram for describing a calculation method of a correction amount used for shake cancelling according to the embodiment.
Figure 10:
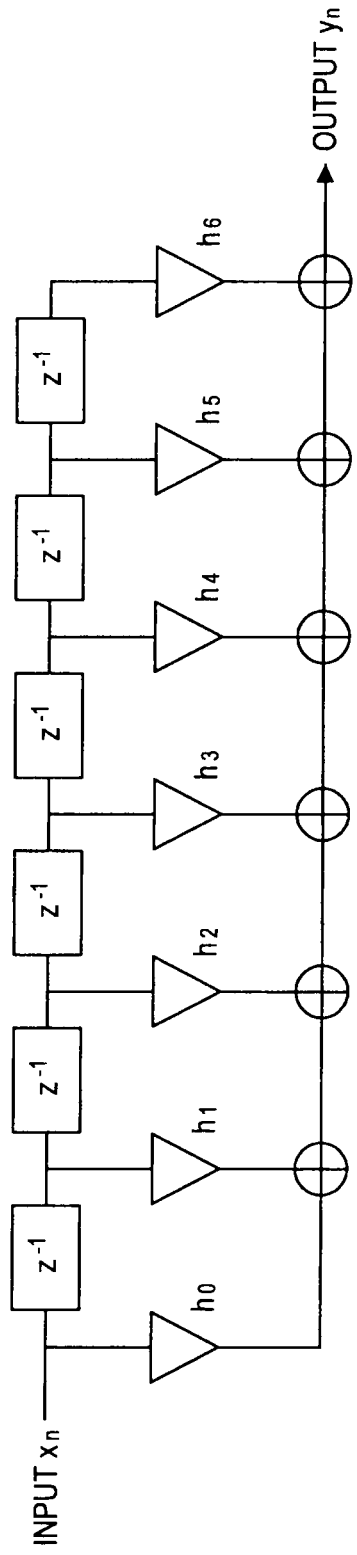
FIG. 10 is an explanatory diagram showing an example circuit configuration of a FIR filter.

Now, the output value of the filter to which the motion data ($Dr, \ldots, D_{t+n}, D_{t+n+1}$) including the predicted position of the face has been applied will be as the interpolated line after filter application shown in FIG. 9. Additionally, in the following explanation, the values on the interpolated line after filter application will be referred to as filter applied data. The filter unit 116 which has obtained the filter applied data sets the difference between the filter applied data at the display time point t+n+1 of a next frame and predicted position $D_{t+n+1}$ as the correction amount. Also, the filter unit 116 converts the unit of the correction amount from the unit of motion data (inch or the like) to the unit of image data (pixel).

Next, the filter unit 116 calculates a maximum value of distance image data can move on the screen (hereinafter, maximum screen movement amount). As shown in FIG. 11, for example, the maximum screen movement amount is calculated from the relationship between a protected area set for the image data and the position of an image frame. The protected area is an area set in advance as an area in the image data that is definitely to be displayed. In this case, the maximum screen movement amount is determined according to a distance between the boundary of the protected area and the image frame.

After calculating the maximum screen movement amount in the manner described above, the filter unit 116 compares the correction amount and the maximum screen movement amount with respect to the direction of each axis. Then, in the case the correction amount is larger than the maximum screen movement amount, the filter unit 116 re-sets the correction amount so that the correction amount will be the maximum screen movement amount. With the correction amount being re-set in this manner, the protected area will not move out of the screen even if the image data is moved based on the correction amount, as shown in FIG. 11.

Figure 12:
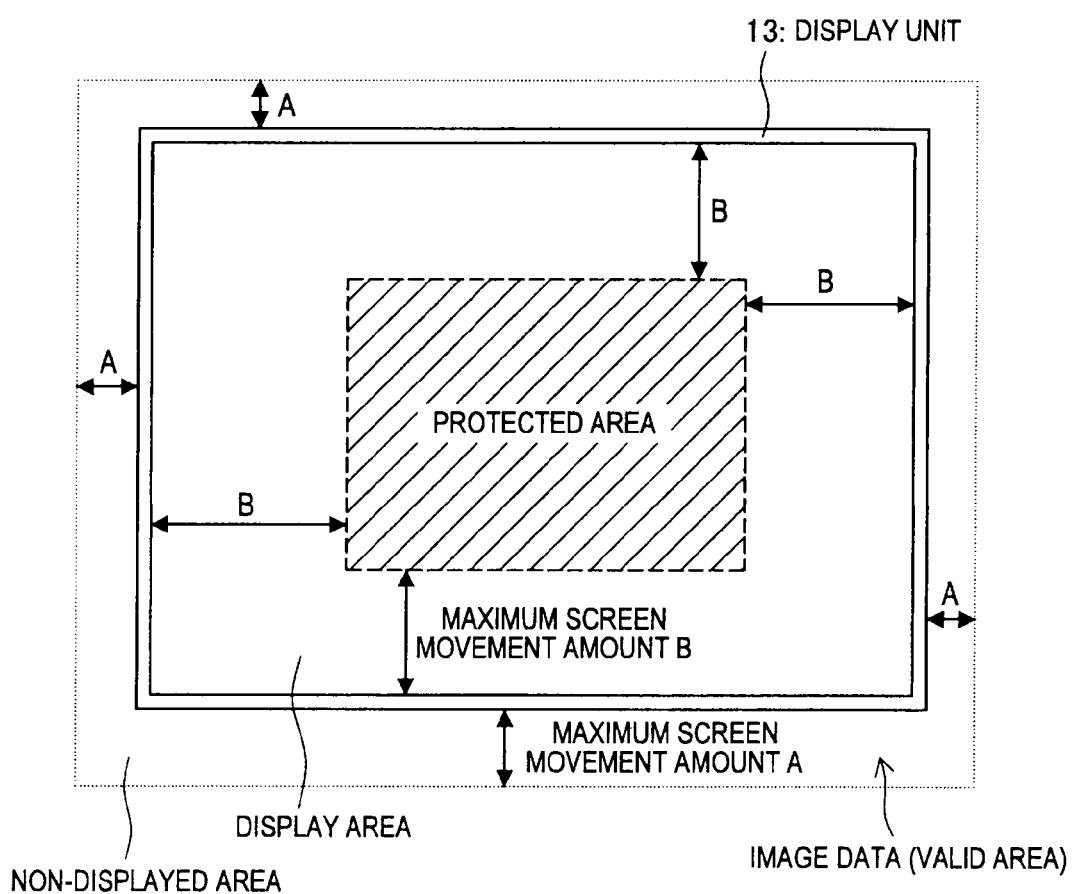
FIG. 12 is an explanatory diagram for describing a shake cancelling method according to the embodiment.

Additionally, as shown in FIG. 12, the filter unit 116 may set the maximum screen movement amount such that the image data is displayed on the entire screen without fail. The image data illustrated in FIG. 12 is larger than the screen size. In this case, the image data is displayed on the entire screen even if the image data is moved by maximum screen movement amount A shown in FIG. 12. That is, to have the image data displayed on the entire screen without fail, the maximum screen movement amount can be set as the maximum screen movement amount A shown in FIG. 12. On the other hand, to have the protected area displayed without fail, the maximum screen movement amount may be set as maximum screen movement amount B shown in FIG. 12.

Additionally, image data exists outside the image frame as shown in FIG. 12 in the case of a game screen, a screen of a digital book, or the like, for example. On the other hand, image data does not exist outside the image frame in many cases of video contents such as movies, personal videos, and the like, for example. Accordingly, whether to select a maximum screen movement amount based on the protected area as shown in FIG. 11 or to select a maximum screen movement amount based on the display area as shown by A of FIG. 12 depends on the type of image data which is an application target. Additionally, even if image data exists outside the image frame, a maximum screen movement amount based on the protected area may be selected, and the correction amount may be set based on the maximum screen movement amount.

As described above, the correction amount calculated by the filter unit 116 or the correction amount re-set based on the maximum screen movement amount is input to the correction vector generation unit 117. Incidentally, in the above explanation, expressions, correction amount of image data and maximum screen movement amount of image data, are used, but the processing described above is performed for each layer. That is, the protected area is set for each layer or the maximum screen movement amount is calculated for each layer, and the correction amount is set for each layer. Then, the correction amount set for each layer is input from the filter unit 116 to the correction vector generation unit 117.

(Correction Vector Generation Unit 117, Motion Compensation Unit 118)

The correction vector generation unit 117 is means for generating a correction vector for correcting the position of a layer by using a correction amount input from the filter unit 116. This correction vector is transformation means for transforming a layer before application of cancellation into a layer after application of cancellation by motion compensation. When taking the coordinate of each pixel forming the layer before application of cancellation as X and the coordinate of each pixel after application of cancellation as X', the coordinate X' is expressed by using the formulae (2) to (7) below. Incidentally, parameters ($h$, $v$, $\theta$, $p$, $h_c$, $v_c$) are parameters related to the correction amount for each axis input by the filter unit 116.

[Equation 2]

$$X' = C^{-1}P^{-1}MPCX \quad (2)$$

$$X = \begin{pmatrix} x \\ y \\ 1 \end{pmatrix} \quad (3)$$

$$X' = \begin{pmatrix} x' \\ y' \\ 1 \end{pmatrix} \quad (4)$$

$$M = \begin{pmatrix} 1 & 0 & h \\ 0 & 1 & v \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \quad (5)$$

$$P = \begin{pmatrix} p & 0 & 0 \\ 0 & 1 & 0 \\ 0 & 0 & 1 \end{pmatrix} \quad (6)$$

$$C = \begin{pmatrix} 1 & 0 & -h_c \\ 0 & 1 & -v_c \\ 0 & 0 & 1 \end{pmatrix} \quad (7)$$

The correction vector generation unit 117 calculates, by using formulae (2) to (7) above, the parameters (h, v, θ, p, $h_c$, $V_c$) from the correction amount for each axis input by the filter unit 116, and inputs a correction matrix V expressed by formula (8) below to the motion compensation unit 118. The motion compensation unit 118 performs motion compensation on a layer by using the correction matrix V input by the correction vector generation unit 117. For example, as shown in FIG. 19, the motion compensation unit 118 performs motion compensation by using linear interpolation and with accuracy below an integer pixel. A layer on which motion compensation has been performed by the motion compensation unit 118 is input to the multiplexing unit 12.

[Equation 3]

$$V = C^{-1}P^{-1}MPC \quad (8)$$

Figure 20:
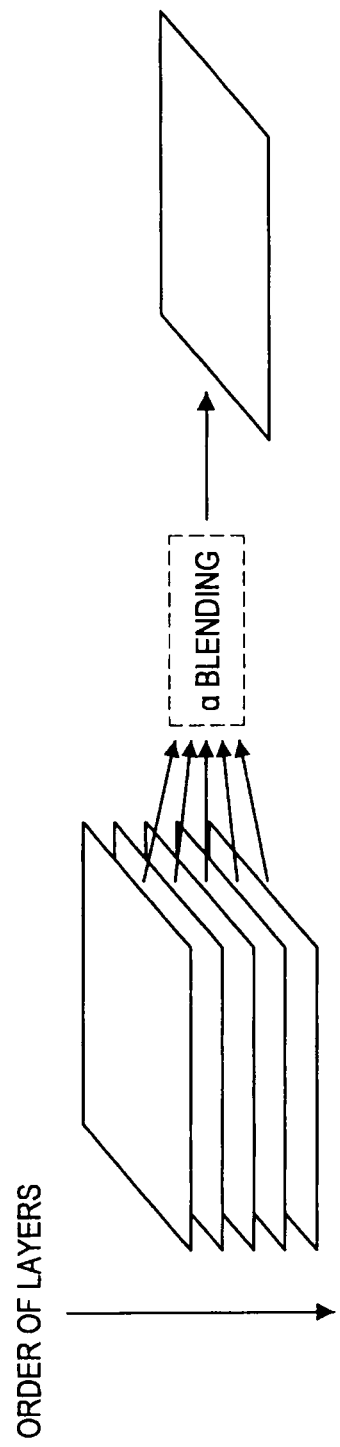
FIG. 20 is an explanatory diagram for describing a layer multiplexing method according to the embodiment.

In the foregoing, a configuration of the image stabilization module 11 has been described in detail. A layer group input from the motion compensation unit 118 to the multiplexing unit 12 is alpha blended and multiplexed into one frame, as shown in FIG. 20. Incidentally, it is assumed that an alpha value (parameter indicating transparency amount) is set for each layer on a per-pixel basis or on a per-layer basis. Then, one frame obtained by the multiplexing unit 12 is displayed on the display unit 13.

In the forgoing, the functional configuration of the portable appliance 10 according to the present embodiment has been described.

[2-2: Operation of User State Detection Unit 115]

Figure 4:
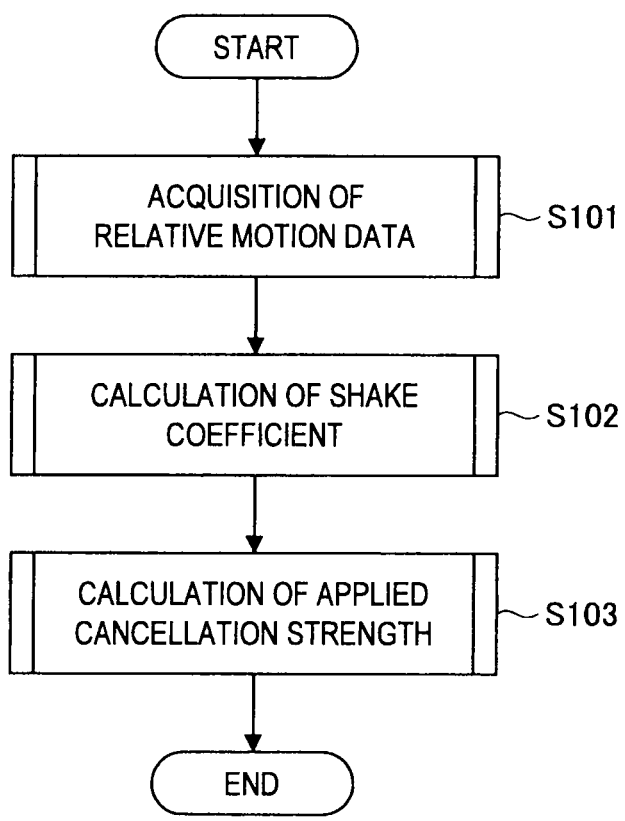
FIG. 4 is an explanatory diagram for describing an operation of an image stabilization module according to the embodiment.

Next, the explanation regarding the operation of the user state detection unit 115 will be supplemented with reference to FIG. 4. FIG. 4 is an explanatory diagram for describing a flow of processes by the user state detection unit 115.

(2-2-1: Flow of Processes)

As shown in FIG. 4, the user state detection unit 115 acquires motion data from the FIFO buffer 114 (S101). Then, the user state detection unit 115 calculates a shake coefficient based on the motion data acquired in step S101 (S102). Next, the user state detection unit 115 calculates applied cancellation strength based on the shake coefficient calculated in step S102 (S103).

(2-2-2: Calculation Method of Shake Coefficient)

The calculation method of the shake coefficient s in step S102 will be described here. Additionally, it is assumed that motion data ($D_t, \ldots, D_{t+n}$) is acquired by the user state detection unit 115 in step S101. The shake coefficient s is a numerical value expressing the intensity of motion expressed by the motion data ($D_t, \ldots, D_{t+n}$). The intensity of motion can be expressed by the intensity of a high-frequency component. Thus, the user state detection unit 115 Fourier transforms the motion data ($D_t, \ldots, D_{t+n}$) and calculates frequency data, and uses the amplitude of the high-frequency component. For example, the user state detection unit 115 calculates a maximum amplitude value in a predetermined frequency domain, among the frequency data, as the shake coefficient s.

(2-2-3: Calculation Method of Applied Cancellation Strength)

Next, the calculation method of the applied cancellation strength in step S103 will be described.

(Case where Only Two States are Taken into Account)

As shown in FIG. 5, in the case of taking only two cases into account, namely a case where cancellation is to be applied and a case where cancellation is not to be applied, the user state detection unit 115 calculates the applied cancellation strength based on comparison results between the shake coefficient s and two thresholds $T_1$ and $T_2$. Additionally, the applied cancellation strength is 1.0 in the case of a cancellation-applied state. On the other hand, the applied cancellation strength is 0.0 in the case of a non-cancellation-applied state.

As described above, in the case the shake coefficient s is large, the shaking of the portable appliance 10 is intense. In the case the shaking of the portable appliance 10 is intense, if image data is moved in a direction of cancelling the shaking, the shaking of the image data relative to a user's gaze point is not reduced, but on the contrary, the shaking of the image data relative to the user's gaze point is possibly increased, due to a delay resulting from computational processing or the like. Furthermore, if the image data is greatly moved, much of the image area will move out of the screen and a non-displayed area of the image data will be too large. Thus, cancellation of shaking is preferably not applied in the case the shaking of the portable appliance 10 is intense.

On the other hand, in the case the shake coefficient s is small, the shaking of the portable appliance 10 is slow. In the case the shaking of the portable appliance is slow, a user can follow the motion of the image data without becoming tired. Thus, no cancellation is necessary in the case the shake coefficient s is small.

For the above reason, thresholds $T_1$ and $T_2$ are preferably determined as follows. For example, with respect to threshold $T_1$, the range of the shaking indicated by the shake coefficient s is about 1% of the screen size. That is, threshold $T_1$ is set to be a value according to which the shaking of the image data relative to the user's gaze point will be negligible. On the other hand, with respect to threshold $T_2$, the range of the shaking indicated by the shake coefficient s is about 10% of the screen size. That is, it is set to be a value according to which, in the case cancellation has been applied, the effect of cancellation is obtained and the non-displayed area is not too large. Additionally, the numerical values of thresholds $T_1$ and $T_2$ are not limited to the examples described above. Also, thresholds $T_1$ and $T_2$ may be fixed values, or they may be variable.

(Case where Applied Cancellation Strength is Continuous Value)

Furthermore, a method of continuously determining the applied cancellation strength according to the shake coefficients s is also conceivable. For example, the applied cancellation strength can be defined by a real number between 0.0 and 1.0, as shown in FIG. 6. At this time, the non-cancellation-applied state is defined to be a state where the applied cancellation strength is 0.0. According to the characteristic curve of the applied cancellation strength illustrated in FIG. 6, the applied cancellation strength is increased or decreased smoothly along with the increase in the shake coefficient s. But the characteristic of the applied cancellation strength is not limited to such. For example, it may be a characteristic according to which the applied cancellation strength linearly increases from shake coefficient s, and after reaching applied cancellation strength of 1.0 at shake coefficient $s_2$ ($s_2 > s_1$), linearly decreases from shake coefficient $s_3$ ($s_3 > s_2$).

In the foregoing, an operation of the user state detection unit 115 has been described.

[2-3: Operation of Filter Unit 116]

Figure 7:
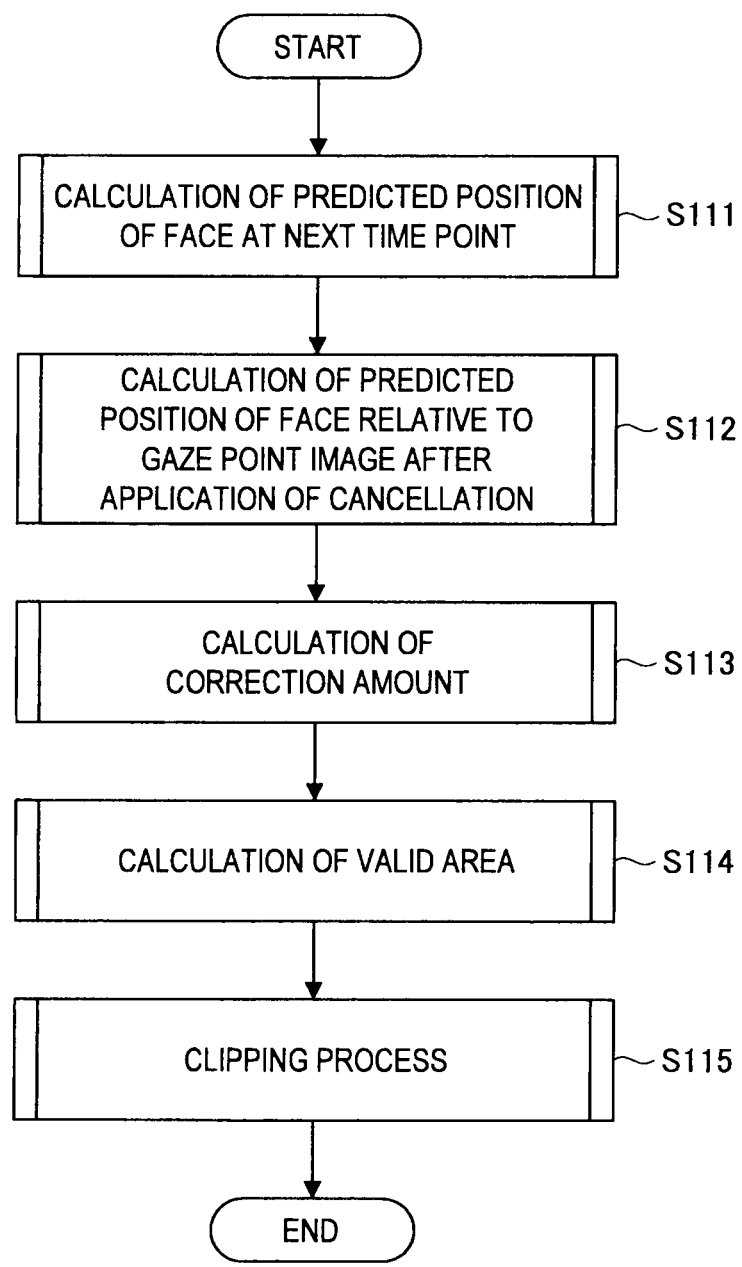
FIG. 7 is an explanatory diagram for describing a calculation method of a correction amount used for shake cancelling according to the embodiment.

Next, the explanation regarding the operation of the filter unit 116 will be supplemented with reference to FIG. 7. FIG. 7 is an explanatory diagram for describing a flow of processes by the filter unit 116.

(2-3-1: Flow of Processes)

As shown in FIG. 7, the filter unit 116 predicts motion data (predicted position of face; see FIG. 8) at a display time point of a next frame based on the motion data read from the FIFO buffer 114 (S11). Next, the filter unit 116 applies motion data including the predicted position of a face to a predetermined filter and calculates a predicted position after application of cancellation (S112). Then, the filter unit 116 deducts the predicted position before application of filter from the predicted position after application of cancellation and calculates a correction amount (see FIG. 9) (S113).

Figure 11:
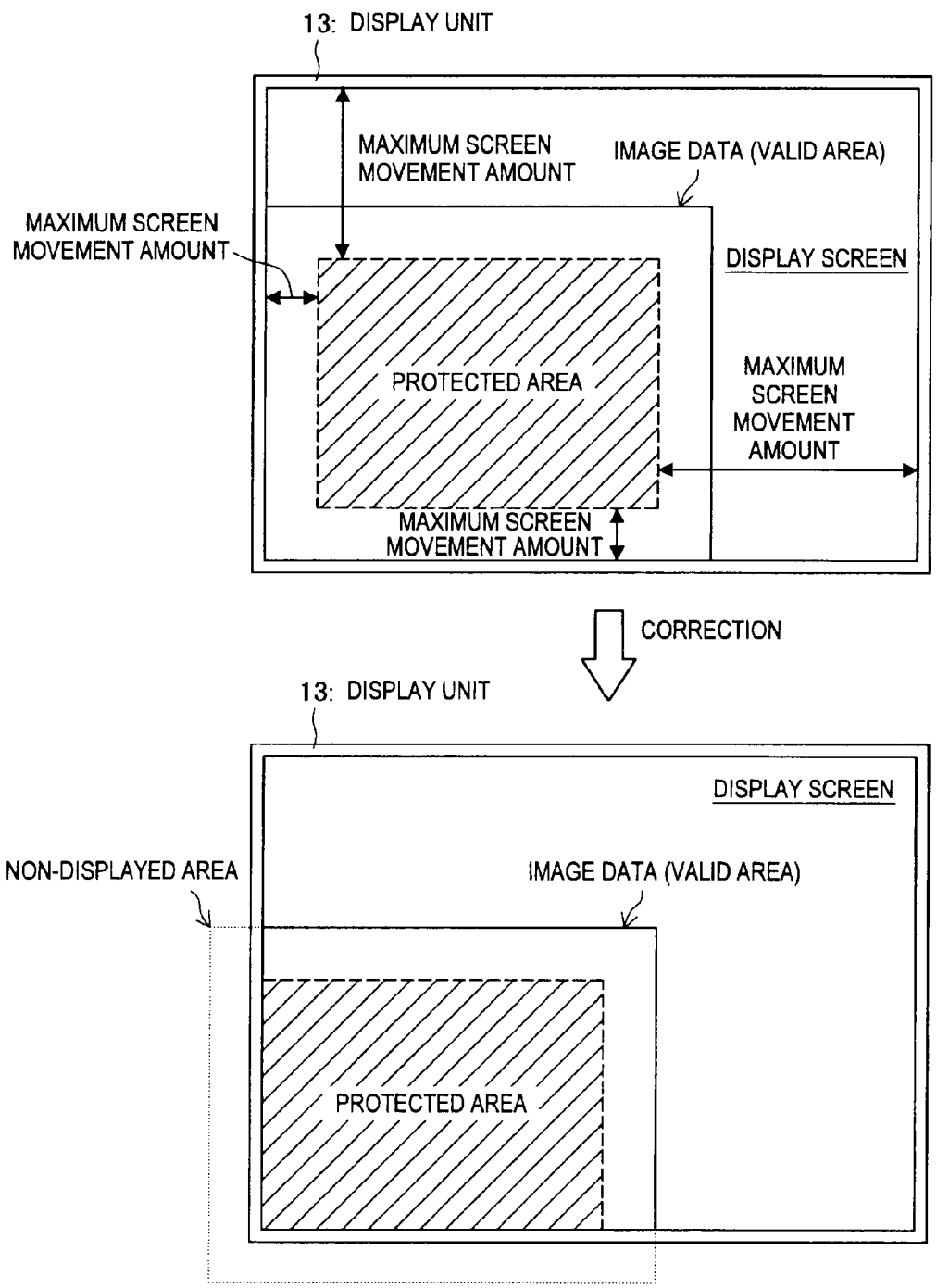
FIG. 11 is an explanatory diagram for describing a shake cancelling method according to the embodiment.

Then, the filter unit 116 calculates a valid area (area including information on an image) of the image data as shown in FIGS. 11 and 12 (S114). Next, the filter unit 116 re-sets the correction amount based on a maximum screen movement amount as shown in FIG. 11 or 12 (clipping process) (S115). For example, in the case the correction amount is above the maximum screen movement amount, the maximum screen movement amount is set to the new correction amount, and in the case the correction amount is not above the maximum screen movement amount, the correction amount calculated in step S113 is maintained.

(2-3-2: Calculation of Predicted Position)

The calculation method of the predicted position of step S111 will be described here.

As the calculation method of the predicted position, there is, for example, a linear prediction method using two adjacent samples ($D_{t+n-1}$, $D_{t+n}$), as shown in FIG. 8. According to this method, a straight line connecting the two adjacent samples ($D_{t+n-1}$, $D_{t+n}$) is extended, and motion data $D_{t+n+1}$ at the display time point t+n+1 of a next frame is predicted.

Furthermore, as the calculation method of the predicted position, a prediction method using a spline curve of motion data ($D_t$, . . . , $D_{t+n}$) is also conceivable, for example. According to this method, a spline curve based on the motion data ($D_t$, . . . , $D_{t+n}$) is calculated, and the motion data $D_{t+n+1}$ is predicted by extending the spline curve to the display time point t+n+1 of a next frame.

(2-3-3: Calculation of Correction Amount)

Next, the calculation method of the correction amount of steps S112 and S113 will be described.

At the time of calculating the correction amount, an interpolated line after filter application is first calculated as shown in FIG. 9. This interpolated line after filter application is an output value of a filter to which motion data ($D_t$, . . . , $D_{t+n}$, $D_{t+n+1}$) including the predicted position has been applied. The interpolated line after filter application corresponds to a shaking state where shaking of the image data relative to a user's gaze point is suppressed. That is, the filter applied data at the display time point t+n+1 of the next frame corresponds to the predicted position of motion data which will be obtained after application of cancellation. Thus, the filter unit 116 which has obtained the filter applied data sets the difference between the filter applied data at the display time point t+n+1 of the next frame and predicted position $D_{t+n+1}$ as the correction amount.

(2-3-4: Determination Method of Maximum Screen Movement Amount Taking Protected Area and the Like into Account)

Next, referring to FIGS. 11 and 12, a determination method of the protected area and the maximum screen movement amount of the image data will be described in relation to the clipping process of step S115.

(Configuration for Protecting Protected Area)

Image data includes an area that is desired to be displayed within the screen. Accordingly, this area will be set as the protected area. For example, in the case the portable appliance 10 is an eBookReader, an area in which the body text is placed or the like is set as the protected area. Also, in the case the portable appliance 10 is a portable game machine, an area displaying the main character whose role a user is assuming or the like is set as the protected area. To display the protected area within the screen, it would suffice if the distance between the boundary of the protected area and the image frame is 0 or more after application of cancellation of shaking. Therefore, it is adequate if the distance between the boundary of the protected area and the image frame at a present time is set to the maximum screen movement amount. Also, it is adequate if the correction amount does not exceed the maximum screen movement amount. Thus, in the case the correction amount exceeds the maximum screen movement amount, the filter unit 116 re-sets the correction amount to the maximum screen movement amount.

(Configuration for Displaying Image Data on Entire Screen)

There may be image data that is larger than the screen size. For example, a background image or the like of a game is sometimes set to be larger than the screen size. Also, it is sometimes desired that the image data is displayed on the entire screen. In such a case, the maximum screen movement amount is determined not by the distance between the boundary of the protected area and the image frame but by the distance between the boundary of the image data and the image frame. As shown in FIG. 12, if the maximum screen movement amount is determined by the distance between the boundary of the protected area and the image frame, the maximum screen movement amount will be as B. On the other hand, if the maximum screen movement amount is determined by the distance between the boundary of the image data and the image frame, the maximum screen movement amount will be as A.

If cancellation of shaking is applied based on the maximum screen movement amount B, an area on which the image data is not displayed may possibly be included in a part of the screen. In contrast, when cancellation of shaking is applied based on the maximum screen movement amount A, there is no possibility that an area on which the image data is not displayed will be included in a part of the screen. Therefore, in a case the image data is desired to be displayed on the entire screen, the maximum screen movement amount is determined to be A. Then, if the correction amount is larger than this maximum screen movement amount A, the correction amount is re-set based on the maximum screen movement amount A. By determining the maximum screen movement amount in this manner, it becomes possible to apply cancellation of shaking while displaying the image data on the entire screen.

(2-3-5: Determination Method of Maximum Screen Movement Amount Taking Gaze Area into Account)

Incidentally, in the present embodiment, the gaze point of the user 20 is detected by the user state detection unit 115. Therefore, the maximum screen movement amount and the correction amount can be determined taking the gaze point of the user 20 into account. Accordingly, a determination method of the maximum screen movement amount that takes the gaze point of the user 20 into account will be considered with reference to FIGS. 13 to 18.

Figure 13:
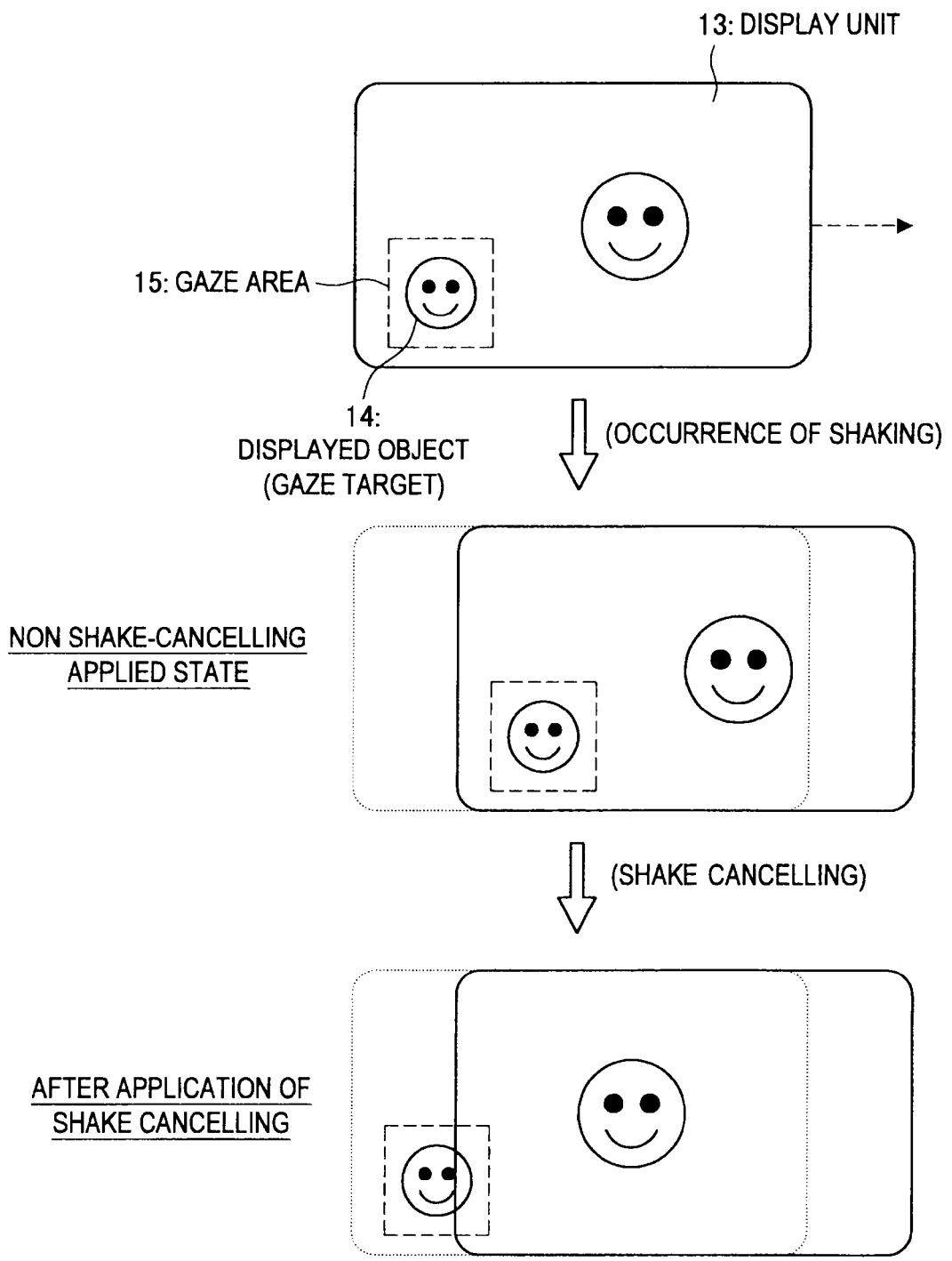
FIG. 13 is an explanatory diagram for describing a shake cancelling method according to the embodiment.

First, FIG. 13 will be referred to. An area including the displayed object 14 the user 20 is focusing on will be referred to as a gaze area 15. This gaze area 15 is the target the user 20 is focusing on, and it has to be controlled so as not to move out of the frame of the display unit 13 after application of shake cancelling. As shown in FIG. 13, in the case of not applying the shake cancelling, the gaze area 15 is still relative to the display unit 13, and it does not move out of the frame of the display unit 13.

Figure 14:
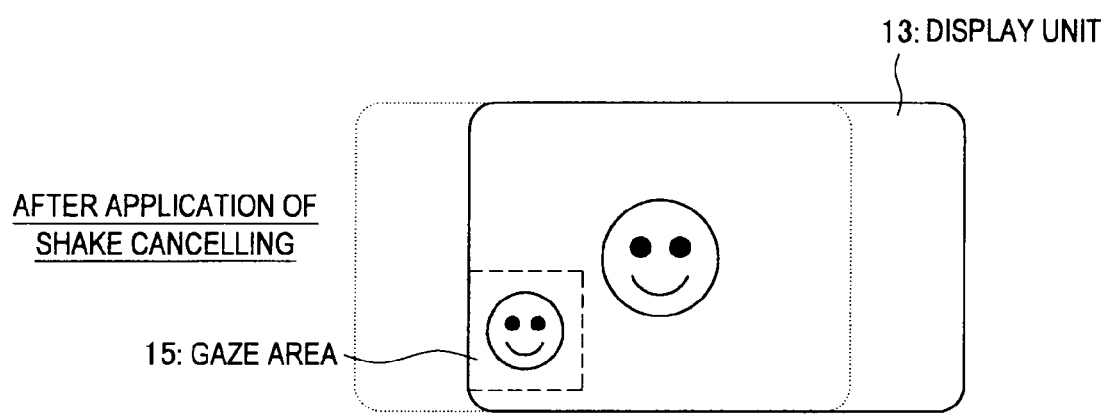
FIG. 14 is an explanatory diagram for describing a shake cancelling method according to the embodiment.

On the other hand, in the case shake cancelling is applied, the displayed object 14 is moved in such a way that shaking of the displayed object 14 is suppressed relative to the gaze point of the user 20, and thus there is a possibility that the gaze area 15 moves out of the frame of the display unit 13. Accordingly, as shown in FIG. 14, the filter unit 116 performs control so as to weaken the applied cancellation strength on the layer including the gaze area 15 and so that the gaze area stays within the frame of the display unit 13. Additionally, the filter unit 116 can identify the position of the gaze area 15 from the gaze point of the user 20 detected by the user state detection unit 115. Thus, the filter unit 116 can determine the applied cancellation strength, taking into account the positional relationship between the frame of the display unit 13 and the gaze area 15.

Figure 15:
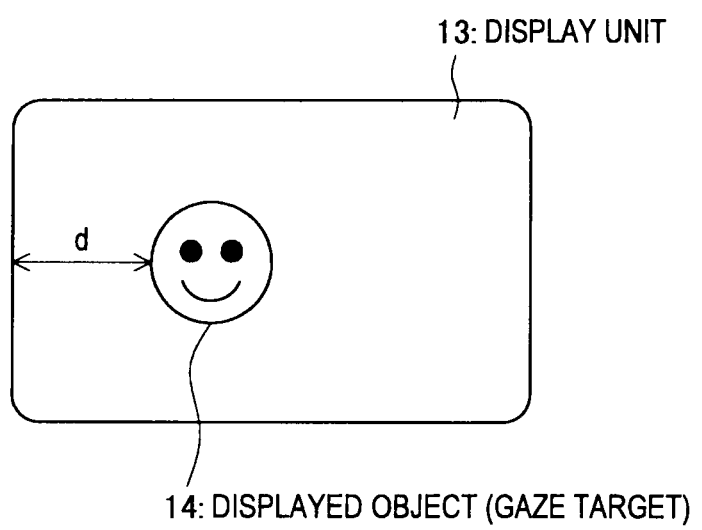
FIG. 15 is an explanatory diagram for describing a shake cancelling method according to the embodiment.
Figure 16:
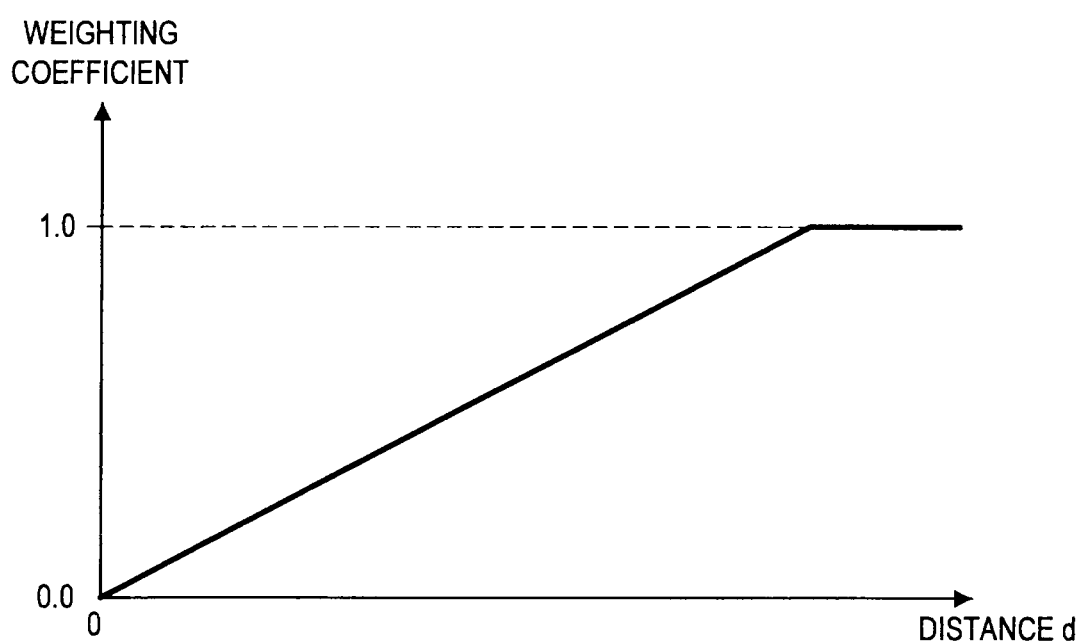
FIG. 16 is an explanatory diagram for describing a shake cancelling method according to the embodiment.
Figure 17:
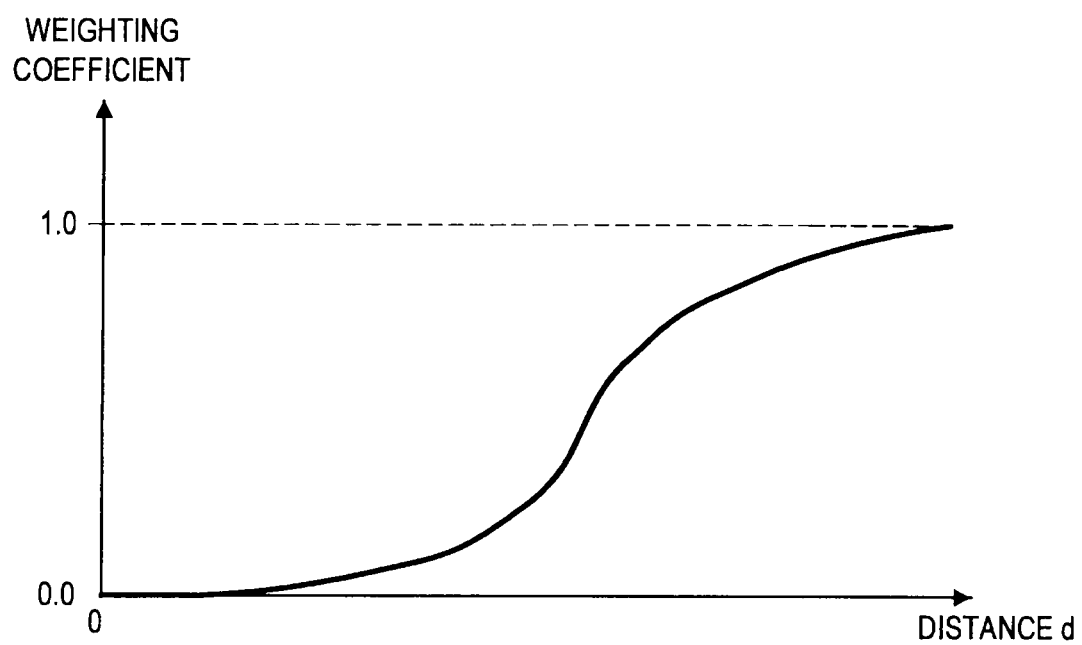
FIG. 17 is an explanatory diagram for describing a shake cancelling method according to the embodiment.

For example, as shown in FIG. 15, the filter unit 116 calculates a distance d between the displayed object 14 included in the gaze area 15 and the frame of the display unit 13. Then, the filter unit 116 determines a weighting coefficient for controlling the applied cancellation strength based on a characteristic curve as shown in FIG. 16 or 17. The applied cancellation strength is multiplied by this weighting coefficient. As shown in FIGS. 16 and 17, the characteristic curves have a form according to which the weighting coefficient becomes smaller as the distance d becomes shorter. That is, this characteristic curves are set such that the applied cancellation strength becomes weaker as the gaze area 15 nears the frame of the display unit 13. Accordingly, by adjusting the applied cancellation strength based on the characteristic curve, the gaze area 15 can be controlled so as not to move out of the frame of the display unit 13.

Figure 18:
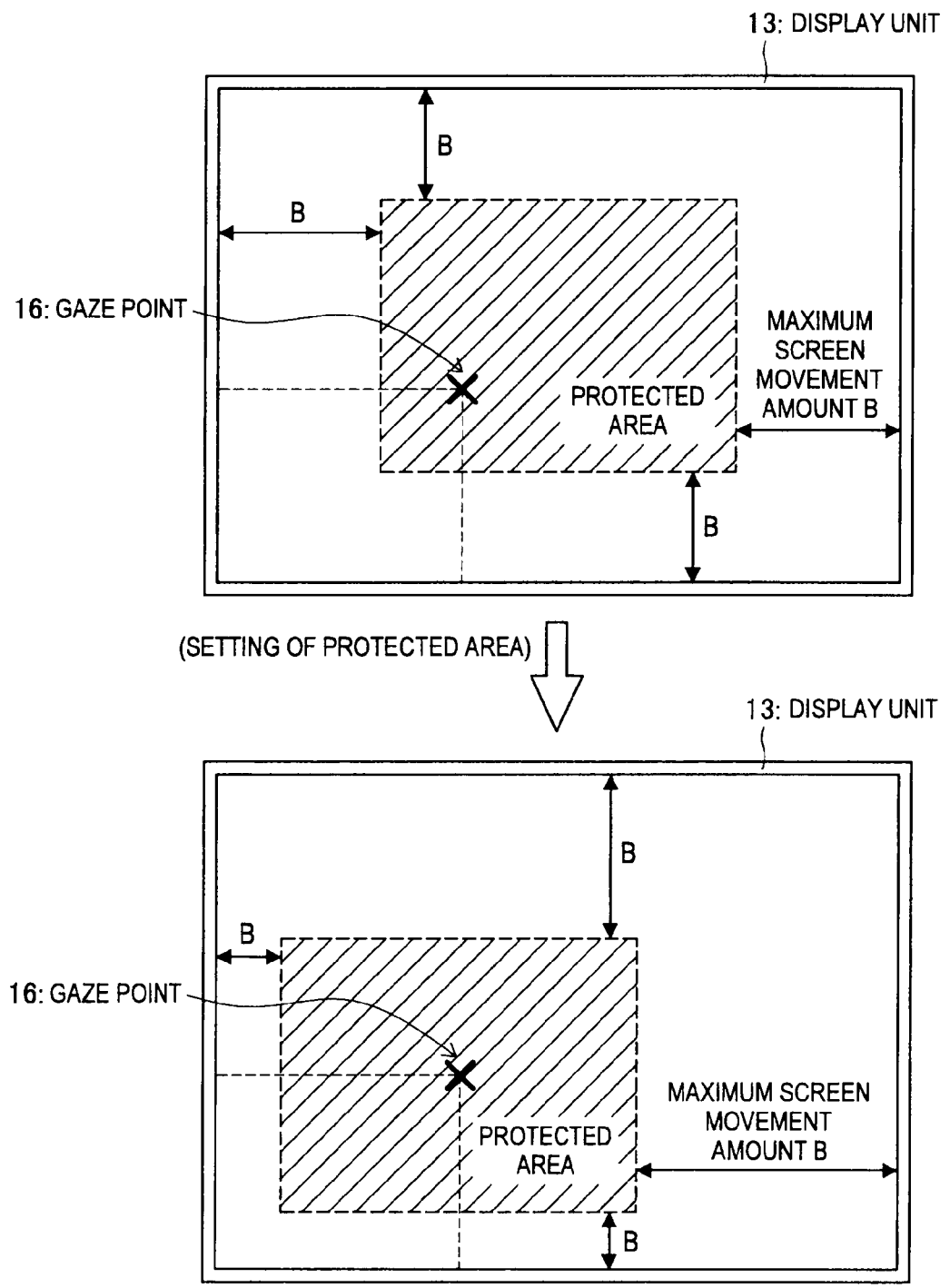
FIG. 18 is an explanatory diagram for describing a shake cancelling method according to the embodiment.

Next, a determination method of the protected area based on the gaze point (a gaze point 16) of the user 20 will be described. Heretofore, it was assumed that the protected area was set for each layer. However, as shown in FIG. 18, a method of determining the protected area based on the gaze point 16 is also conceivable. For example, a method is conceivable in which the size of the protected area is set in advance and the protected area is determined in such a way that the gaze point 16 will be the centre, as shown in FIG. 18. In this case, the filter unit 116 determines the protected area in such a way that the gaze point 16 detected by the user state detection unit 115 will be its centre, and performs control such that the protected area does not move out of the frame of the display unit 13 after application of shake cancelling.

First, the filter unit 116 detects the distance between the determined protected area and the frame of the display unit 13, and calculates a maximum screen movement amount B according to the detection result, as shown in FIG. 18. At this time, the filter unit 116 calculates the maximum screen movement amount B for each side of the frame of the display unit 13. Then, the filter unit 116 re-sets the correction amount such that the correction amount falls within the range of the maximum screen movement amount B. With the protected area determined with the gaze point 16 as its centre, the area that the user 20 is gazing can be prevented from moving out of the frame of the display unit 13. For example, in the case the user 20 is reading a digital book, the portion that is being read can be prevented from being hidden outside the frame of the display unit 13 due to the shake cancelling.

In the foregoing, an operation of the filter unit 116 has been described.

[2-4: Modification (Control Method of Applied Cancellation Strength According to Layer Use)]

Next, referring to FIG. 21, a control method of the applied cancellation strength according to a use of a layer will be described as a modification of the present embodiment. Generally, a use is determined, in many cases, for each layer forming image data.

For example, image date is formed by multiplexing layers for various uses, such as a layer for video, a layer for texts, a layer for attribute information display, and the like. The degree of visibility desired by the user 20 is different depending on the display contents, such as a video, texts and attribute information. For example, a video can be satisfactorily viewed even if it is slightly shaking relative to the gaze point of the user 20. On the other hand, texts will be difficult to read if they are shaking relative to the gaze point of the user 20. Also, the displayed object 14 such as an operation button will be difficult to operate if it is not following the motion of the portable appliance 10. For these reasons, the applied cancellation strength is controlled preferably according to the use of a layer.

As a method of realizing control, according to the use of a layer, of the applied cancellation strength, the present modification introduces a filter strength weighting coefficient shown in FIG. 21. This filter strength weighting coefficient is a coefficient for adjusting the applied cancellation strength. That is, the applied cancellation strength is stronger and the tap length of a filter is set to be longer as the filter strength weighting coefficient is larger. In contrast, the applied cancellation strength is weaker and the tap length of a filter is set to be shorter as the filter strength weighting coefficient is smaller. In other words, the shake cancelling is strongly applied when the filter strength weighting coefficient is large, and the application strength of the shake cancelling is weakened when the filter strength weighting coefficient is small.

In the example of FIG. 21, filter strength weighting coefficient 1 is set for the layer for video. Also, filter strength weighting coefficient 3 is set for the layer for texts. Furthermore, filter strength weighting coefficient 0 is set for the layer for attribute information display. Accordingly, in the case of the setting illustrated in FIG. 21, the motion of the layer for texts is controlled in such a way that shaking is strongly cancelled relative to the user 20's gaze point. On the other hand, no cancellation is applied to the layer for attribute information display. In this manner, with the application strength of cancellation being adjusted according to the use of a layer, the visibility of the user can be improved.

In the foregoing, an embodiment of the present invention has been described.

3: Hardware Configuration

Figure 22:
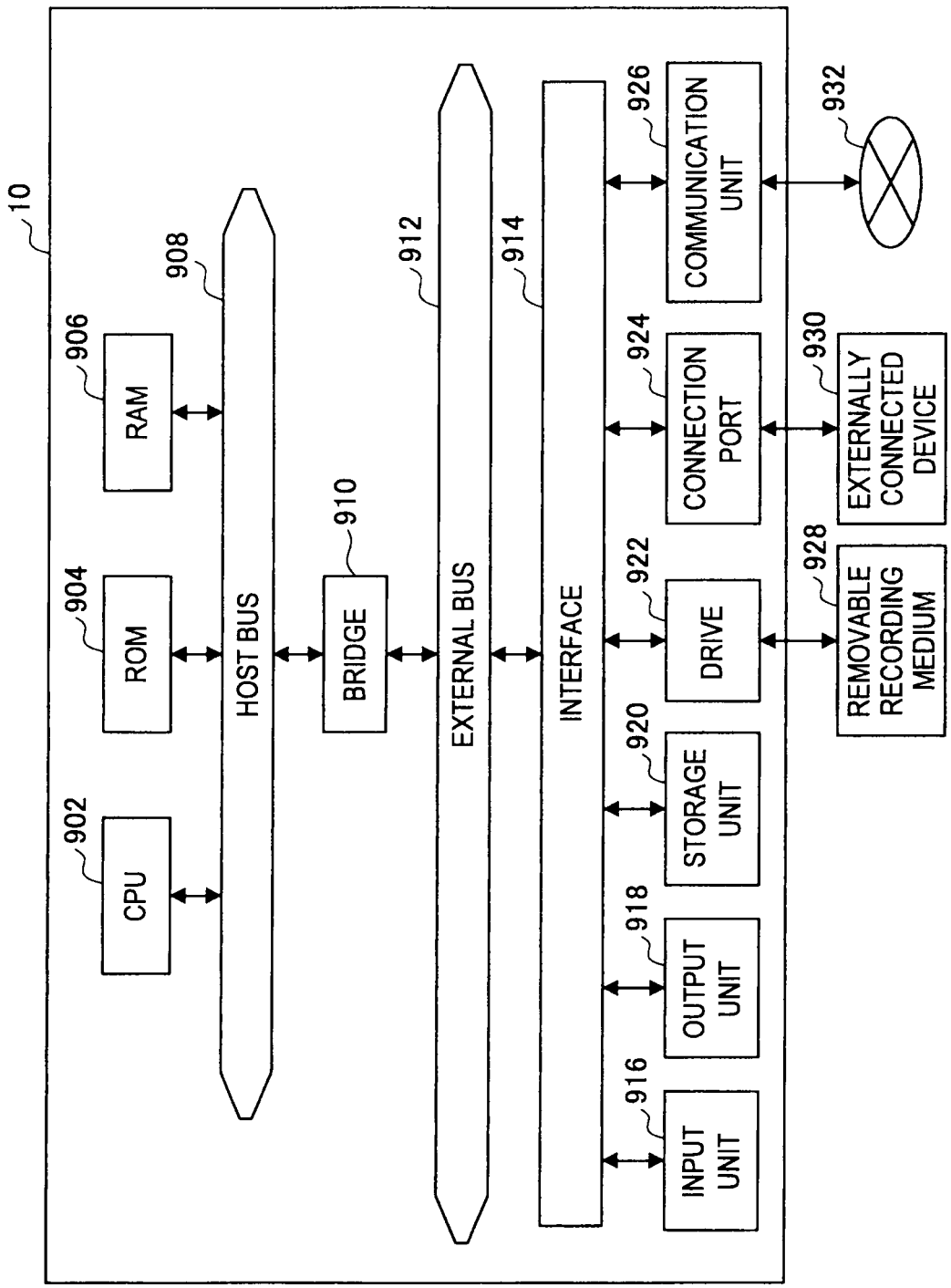
FIG. 22 is an explanatory diagram for describing a hardware configuration capable of realizing functions of structural elements of the portable appliance according to the embodiment.

The function of each structural element of the portable appliance 10 described above can be realized by using, for example, the hardware configuration of an information processing apparatus illustrated in FIG. 22. That is, the function of each structural element can be realized by controlling the hardware shown in FIG. 22 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 22, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

4: Summary

Lastly, the technical contents according to the embodiment of the present invention will be briefly described. The technical contents stated here can be applied to various information processing apparatuses, such as a personal computer, a mobile phone, a portable game machine, a portable information terminal, an information appliance, a car navigation system, and the like.

The functional configuration of the information processing apparatus described above can be expressed as follows. The information processing apparatus includes an image capturing unit, a motion detection unit, a motion prediction unit, an image data display unit, and a motion correction unit as below. The image capturing unit is for capturing an image of a face of a user. Also, the motion detection unit is for detecting motion of the face whose image has been captured by the image capturing unit. In this manner, the motion of a face is detected by the motion detection unit, and thereby the relative motion between the information processing apparatus and the face of a user is detected.

Also, the motion prediction unit is for predicting motion of the face to be detected at a next time point, based on the motion of the face detected in time-series by the motion detection unit. Furthermore, the image data display unit is for displaying image data. Furthermore, the motion correction unit is for performing control on the image data display unit to move the image data in a direction of cancelling the motion of the face predicted by the motion prediction unit. That is, the image data is moved in such a way that the relative motion of the face to the information processing apparatus is cancelled. As a result, even if the information processing apparatus and the face of the user both moved, the motion of the image data relative to the user's gaze point can be reduced and the fatigue of the user can be reduced.

(Notes)

The captured image data acquisition unit 112 is an example of an image capturing unit, a motion detection unit, and a gaze point detection unit. The user state detection unit 115, and the filter unit 116 are examples of a motion prediction unit. The filter unit 116, the correction vector generation unit 117, and the motion compensation unit 118 are examples of a motion correction unit. The filter unit 116 is an example of a protected area setting unit, and a gaze area determination unit.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-130436 filed in the Japan Patent Office on Jun. 7, 2010, the entire content of which is hereby incorporated by reference.

What is claimed is:

1. An image stabilization device comprising:
an image capturing unit for capturing an image of a face of a user;
a motion detection unit for detecting motion of the face whose image has been captured by the image capturing unit;
a motion prediction unit for predicting motion of the face to be detected at a next time point, based on the motion of the face detected in time-series by the motion detection unit;
an image data display unit for displaying image data;
a motion correction unit for performing control on the image data display unit to move the image data in a direction of cancelling the motion of the face predicted by the motion prediction unit; and
a gaze point detection unit for detecting a position of a gaze point from the image of the face captured by the image capturing unit,
wherein the image stabilization device includes either
a protected area setting unit for setting, in the image data, an image area of a predetermined range centered on the position of the gaze point, which has been detected by the gaze point detection unit, as a protected area, or
a gaze area determination unit for determining, in the image data, a gaze area of a predetermined size including a displayed object existing at the position of the gaze point detected by the gaze point detection unit, and
wherein the motion correction unit performs control on the image data display unit to move, within a range that allows display of either: all of the protected area set by the protected area setting unit, or the gaze area determined by the gaze area determination unit, the image data in the direction of cancelling the motion of the face predicted by the motion prediction unit.

2. The image stabilization device according to claim 1, wherein the motion correction unit performs control on the image data display unit to move the image data in the direction of cancelling the motion of the face predicted by the motion prediction unit in such a way that a degree of cancellation of the motion of the face gradually becomes smaller as a distance between a frame of a display screen displaying the image data and the gaze area becomes shorter.

3. An image stabilization method comprising the steps of:
capturing an image of a face of a user;
detecting motion of the face whose image has been captured in the step of capturing;
predicting motion of the face to be detected at a next time point, based on the motion of the face detected in time-series in the step of detecting;
displaying image data;
performing control, in the step of displaying, to move the image data in a direction of cancelling the motion of the face predicted in the step of predicting; and
detecting a position of a gaze point from the image of the face captured by the capturing,
wherein the image stabilization method further includes either the step of
setting, in the image data, an image area of a predetermined range centered on the position of the gaze point, which has been detected by the detecting, as a protected area, or
determining, in the image data, a gaze area of a predetermined size including a displayed object existing at the position of the gaze point detected by the detecting, and
wherein the performing step performs control in the step of displaying to move, within a range that allows display of either: all of the protected area set by the setting, or the gaze area determined by the determining, the image data in the direction of cancelling the motion of the face predicted by the predicting.

4. A non-transitory computer readable medium having stored thereon a program for causing a computer to realize:
an image capturing function of capturing an image of a face of a user;
a motion detection function of detecting motion of the face whose image has been captured by the image capturing function;
a motion prediction function of predicting motion of the face to be detected at a next time point, based on the motion of the face detected in time-series by the motion detection function;
an image data display function of displaying image data; and
a motion correction function of performing control, in relation to the image data display function, to move the image data in a direction of cancelling the motion of the face predicted by the motion prediction function; and
detecting a position of a gaze point from the image of the face captured by the capturing,
wherein the image stabilization method further includes either the step of
setting, in the image data, an image area of a predetermined range centered on the position of the gaze point, which has been detected by the detecting, as a protected area, or
determining, in the image data, a gaze area of a predetermined size including a displayed object existing at the position of the gaze point detected by the detecting, and
wherein the performing step performs control in the step of displaying to move, within a range that allows display of either: all of the protected area set by the setting, or the gaze area determined by the determining, the image data in the direction of cancelling the motion of the face predicted by the predicting.

* * * * *